(12) United States Patent
Kiyama et al.

(10) Patent No.: US 7,457,530 B1
(45) Date of Patent: Nov. 25, 2008

(54) RECORDING METHOD, RECORDING MEDIUM AND RECORDER

(75) Inventors: Jiro Kiyama, Funabashi (JP); Takayoshi Yamaguchi, Nagareyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1279 days.

(21) Appl. No.: 10/048,718

(22) PCT Filed: Jul. 27, 2000

(86) PCT No.: PCT/JP00/05020

§ 371 (c)(1),
(2), (4) Date: Jan. 29, 2002

(87) PCT Pub. No.: WO01/09892

PCT Pub. Date: Feb. 8, 2001

(30) Foreign Application Priority Data

Jul. 30, 1999 (JP) ................... 11-216106

(51) Int. Cl.
 *H04N 5/00* (2006.01)
(52) U.S. Cl. ............... 386/125; 386/46; 386/52; 386/54; 386/95; 386/124
(58) Field of Classification Search ............... 386/125, 386/106, 126, 95, 46, 52, 124, 59.25, 59.26
See application file for complete search history.

(56) References Cited

U.S. PATENT DOCUMENTS

| 5,309,292 | A | 5/1994 | Takakura |
| 5,473,479 | A | 12/1995 | Takakura |
| 5,583,654 | A | 12/1996 | Oguro |
| 5,615,056 | A | 3/1997 | Oguro |
| 6,226,247 | B1 * | 5/2001 | Sako et al. ............... 369/53.31 |
| 6,301,065 | B1 | 10/2001 | Oguro |
| 6,341,196 | B1 * | 1/2002 | Ando et al. ............... 386/95 |
| 6,477,313 | B1 | 11/2002 | Itoi |
| 6,526,217 | B1 * | 2/2003 | Fujinami ............... 386/52 |

FOREIGN PATENT DOCUMENTS

| CN | 1075387 A | 8/1993 |
| CN | 1091850 A | 12/1993 |
| CN | 1164919 A | 11/1997 |
| EP | 0 295 148 A1 | 12/1988 |
| EP | 0 924 704 A2 | 6/1999 |
| EP | 11-213566 | 8/1999 |
| EP | 11-312368 | 11/1999 |
| EP | 2000-339860 | 12/2000 |

(Continued)

*Primary Examiner*—Thai Tran
*Assistant Examiner*—Girumsew Wendmagegn
(74) *Attorney, Agent, or Firm*—David G. Conlin; David A. Tucker; Edwards Angell Palmer & Dodge LLP

(57) ABSTRACT

When audio dubbing is implemented, error correction is performed for each ECC block. Therefore, even when one byte of data in an ECC block is rewritten, the whole ECC block to which the byte belongs needs to be read and rewritten. When audio dubbing data is scattered in ECC blocks, almost all ECC blocks, or all the data needs be rewritten in order to record audio dubbing data. By constructing ECC blocks including audio dubbing data so as not to contain original data, it is no longer necessary to read and rewrite unnecessary original data when audio dubbing data is overwritten.

12 Claims, 20 Drawing Sheets

FOREIGN PATENT DOCUMENTS

| | | |
|---|---|---|
| EP | 1 206 135 A1 | 5/2002 |
| JP | 05-234084 | 9/1993 |
| JP | 05-282803 | 10/1993 |
| JP | 05-303831 | 11/1993 |
| JP | 06-044687 | 2/1994 |
| JP | 08-315505 | 11/1996 |
| JP | 10-322661 | 12/1998 |
| JP | 11-007753 | 1/1999 |
| JP | 11-120709 | 4/1999 |
| JP | 11-144378 | 5/1999 |
| JP | 11-155131 | 6/1999 |
| JP | 11-162119 | 6/1999 |
| JP | 11-187354 | 7/1999 |
| JP | 11-213564 | 8/1999 |
| JP | 11-213566 | 8/1999 |
| JP | 11-312368 | 11/1999 |
| JP | 2000-195231 | 7/2000 |
| JP | 2000339860 * | 8/2000 |
| JP | 2000-306327 | 11/2000 |
| JP | 2000-339860 | 12/2000 |
| JP | 2000339860 A * | 12/2000 |

* cited by examiner

FIG. 7

| BP | Byte Count | Field Name |
|---|---|---|
| 0 | 3 | packet_start_code_prefix |
| 3 | 1 | stream_id |
| 4 | 2 | PES_packet_length |
| 6 | 1 | VU Property |
| 7 | 2 | Length of VU |
| 9 | 2 | Start RLBN of Video Data |

FIG. 10

| BP | Byte Count | Field Name |
|---|---|---|
| 0 | 3 | packet_start_code_prefix |
| 3 | 1 | stream_id |
| 4 | 2 | PES_packet_length |
| 6 | 1 | PRU Property |
| 7 | 2 | Length of PRU |
| 9 | 1 | Number of VU (=NOV) |
| 10 | 2×NOV | Start RLBN of Data for VU |

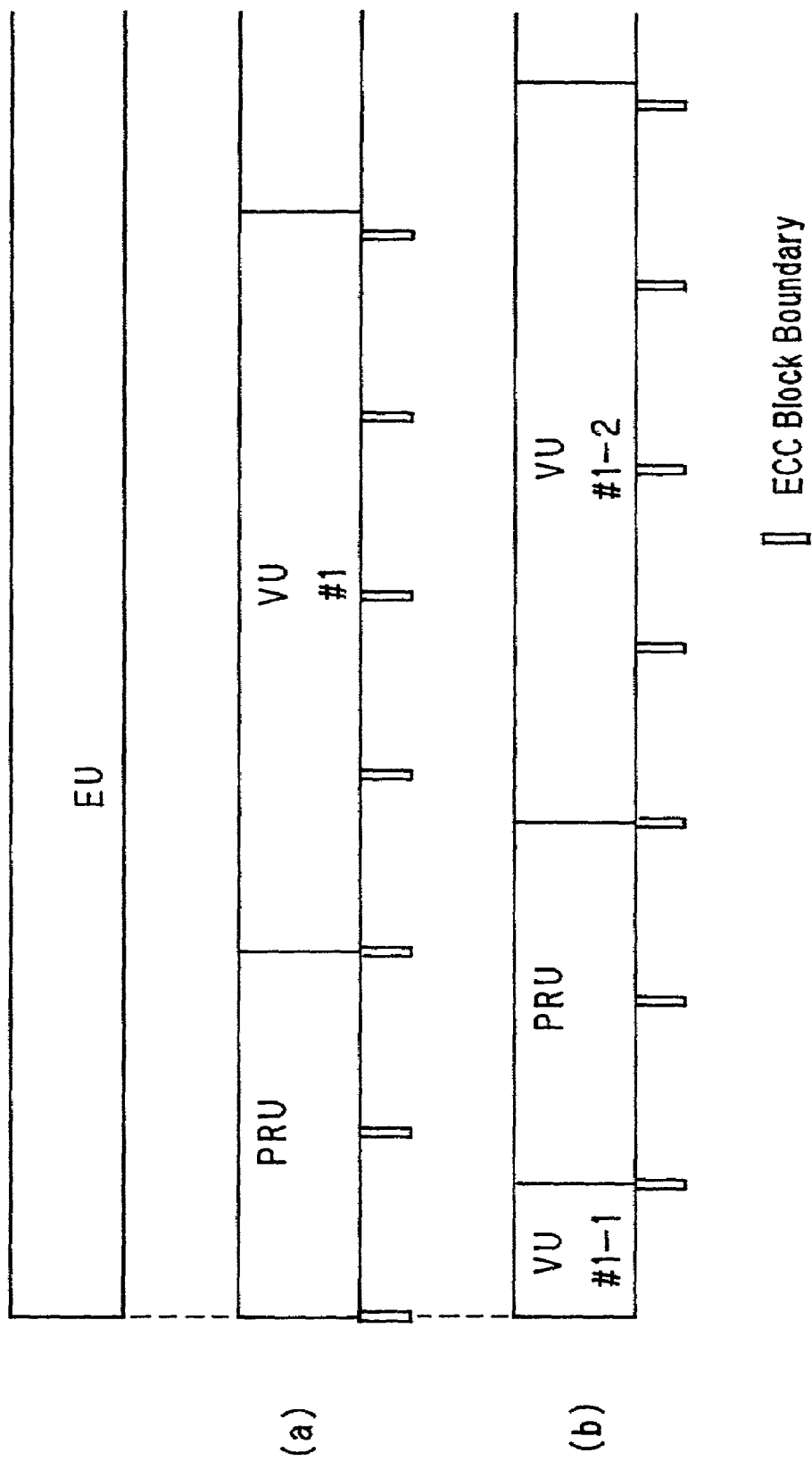

FIG. 12

| BP | Byte Count | Field Name |
|---|---|---|
| 0 | 4 | Table ID |
| 4 | 4 | Table Size |
| 8 | 4 | Next USI ID |
| 12 | 2 | Number of EUSI |
| 14 | — | EUSI |

FIG. 13

| BP | Byte Count | Field Name |
|---|---|---|
| 0 | 4 | EUSI ID |
| 4 | 4 | EUSI Size |
| 8 | 23 | Title Text |
| 31 | 1 | Character of Code |
| 32 | 6 | Time Stamp Creation |
| 44 | 6 | Time Stamp-Modification |
| 50 | 10 | Text Information |
| 60 | 10 | Thumbnail Information |
| 70 | 2 | Data Field ID |
| 72 | 4 | Data File Size |
| 76 | 4 | Start PT |
| 80 | 4 | End PT |
| 84 | 2 | EUS Property |
| 86 | 2 | Video Property |
| 90 | 4 | Camera Property |
| — | 2 | Audio Property |
| — | 2 | Post Recording Unit Size |
| — | 2 | Post Recording Property |
| — | 64 | Source Information |
| | 64 | Copyright Property |
| — | 2 | Number of Still Picture |
| — | — | Still Picture Information |
| — | — | Address LUT |
| — | — | Reference Information |

FIG. 14

| BP | Byte Count | Field Name |
|---|---|---|
| 0 | 4 | Address Offset |
| 4 | 4 | PB Time of EU |
| 8 | 4 | PB Time of VU |
| 12 | 4 | Number of PRU Information (NOPI) |
| 16 | 4 | Number of VU Information (=NOVI) |
| 20 | 4×NOPI | PRU Information |
| — | n×NOVI | VU Information |

FIG. 15

| BP | Byte Count | Field Name |
|---|---|---|
| 0 | 3 | RLBN of PRU |
| 3 | 1 | PRU Status |

FIG. 16

| BP | Byte Count | Field Name |
|---|---|---|
| 0 | 3 | RLBN of VU |
| 3 | 1 | VU Status |
| 4 | 1 | Number of Pictures |
| 5 | 2×NOIP | End RLBN of IP Pictures |

RECORDING METHOD, RECORDING MEDIUM AND RECORDER

TECHNICAL FIELD

The present invention relates to a process of recording video data and audio data onto, and playing back from a random-accessible recording medium such as hard disks, optical disks and the like.

BACKGROUND ART

Digital recording and reproduction apparatus for videos and audios using disk media have become widespread. In these apparatus, there is a demand for development of technologies which realize the audio-dubbing function at a low cost similar to tape media. The audio-dubbing function is a function which allows information, especially audios to be additionally recorded over already recorded audios and videos.

Mentioned as a prior art example of realizing the audio-dubbing function with disk media is Japanese Patent Application Laid-Open Hei 5 No.234084. This technology, by taking advantage of the fact that the reading time of data is shorter than the program presentation time, writes input audio-dubbing data on the disk in the duration after the data to be currently presented has been loaded from the disk into the memory and until the time the next data will be loaded. That is, this method is able to realize audio dubbing using a single disk recording and reproduction device.

Here, the term program presentation time indicates the playback time unique to each program such as video, music etc. For example, a one-minute video must be played back as exactly one minute even if it is played back with a different playback device.

FIG. 22 shows a recording format on a disk in the prior art. This disk is formatted with a series of ECC (error correction cording) blocks. This ECC block is the minimum unit for encoding in which data is added with error correction parities and encoded. For reading data, each block of data is read out as a unit and error corrected to extract the necessary data. On the other hand, data rewriting is performed by reading each ECC block of data, performing error correction, renewing the necessary part of the error corrected data, re-assigning error codes to the data and recording it on the disk. This means that even when only one byte of data needs to be rewritten, the entire ECC block which includes that byte of data should be read out and renewed.

In each ECC block, video data and audio data are arranged as shown in FIG. 22(b) sequentially in the order of an audio dubbing block, original audio block and original video block. In each block, the dubbed audio, original audio and original video corresponding to approximately the same period of time are included. Herein, the original audio block together with the original video block will be called an original block. When an original program (a video data prior to recording of a dubbing audio data) needs to be recorded, dummy data should be written beforehand into audio dubbing blocks.

Next, the operation of audio dubbing in the prior art will be described with reference to FIG. 23. In this figure, the chart at the top shows associated means and the relationship between the associated means and processed positions on the recording medium. The chart at the middle shows the position of the head in the disk and the chart at the bottom schematically shows the ratio of the program data occupied in a buffer memory 108.

Here, a program is allotted to a continuous area s11-s18 on the disk, where areas s11-s13, s13-s15 and s15-s17 represent individual ECC blocks and areas s11-s12, s13-s14, s15-s16 and s17-s18 correspond to individual audio dubbing blocks (s11 and s12 represent points on the disk).

At time t1, the data from the area up to s13 has been stored in buffer memory 108, and the data recorded in area s11-s13 is decoded and presented (played back) whilst dubbed voice corresponding to that data is being input and encoded.

During the period of time t1 to t3, the data in area s13-s15 is loaded from the disk into buffer 108 and an audio dubbing buffer. The audio dubbing buffer holds the read ECC block as is, which has the same structure as shown in FIG. 22(b).

At time t2, decoding and playing back of the data recorded in the area s11-s1, which was being done at time t1, ends. After time t2, the data read out from the area s13-s15 during the period from time t1 to t3 is decoded and played back whilst voice dubbing corresponding to that data is being input and encoded. Decoding and playing back of the data belonging to this area s13-s15 continues until time t5.

Encoding of the voice dubbing having been input up to time t2 is completed at least before time t3. At time t3, the voice dubbing having been input up to time t2 starts to be recorded to the disk medium. Though some time is needed to wait the disk to turn for accessing s11, this time is short compared to the time for data to be read from or written to the disk so no consideration is given herein.

Writing dubbed sound to the disk is performed from time t3 to t4. When this writing to the disk completes at time t4, the data belonging to the area s15-s17 on the disk starts to be loaded from time t4. In this way, the same processing sequence is repeated from this point and thereafter.

In this prior art, use of the advantage that the reading time of data is shorter than the playback time of the data as a result of data compression is made so as to enable a single recording and reproducing means to realize audio dubbing by controlling the recording and reproducing means time-divisionally for both recording and reproduction.

As has been described, since error correction coding is performed for each ECC block as a unit, even if only one byte of data in an ECC block needs to be renewed, it is necessary to read and rewrite the entire ECC block involving that byte of data. When pieces of audio dubbing data are diversely distributed in ECC blocks as in the above prior art, it is necessary to rewrite almost all ECC blocks or all data in order to record audio dubbing data. In order to perform audio dubbing by rewriting many ECC blocks, a disk drive having high-speed reading/writing performance should be used or the amount of data to be read and written should be reduced.

Use of a disk drive having high-speed reading writing performance is expensive compared to that of low speed. Further, a higher power consumption is needed because of enhancement of the rotating speed of the disk. On the other hand, if it is attempted to realize audio dubbing with a disk drive of a low speed, the image quality should be compromised to reduce the amount of data.

The present invention has been devised in view of the above problems of the prior art, it is therefore an object of the present invention to realize audio dubbing, using a disk drive of a relatively low data transfer rate in a configuration where recording and reproduction can be performed only by ECC block units and still without either causing any time lag with respect to the original video or compromising any image quality.

DISCLOSURE OF INVENTION

In order to achieve the above object, the present invention has the following configurations.

The first aspect of the present invention resides in a recording method of recording data onto a recording medium whereby first data comprising video or audio data and second data to be reproduced in synchronization with the first data are divided into blocks of a predetermined amount of data, each block as a unit is subjected to error correction coding and formed into an encoded block, and each of the encoded blocks is recorded as a unit onto the recording medium, the recording method comprising the steps of: managing the first data corresponding to a predetermined playback time and the second data to be reproduced in synchronization with the first data, as a first unit; encoding the second data in the first unit into an integer number of encoded blocks and arranging them continuously, keeping them apart from the first data; and arranging the encoded blocks of the second data in the first unit at a boundary between encoded blocks, appearing first in the first unit.

With this configuration, the encoded blocks containing the second data (e.g., audio dubbing data) consist of the second data only, so that writing of the second data may be performed for only the encoded blocks of the second data, by rewriting the minimum area. Further, since the second data is located at the boundary between encoded blocks, appearing first in the first unit, synchronized playback can be started only when the whole second data and one encoded block of the first data have been loaded so that it is possible to reduce the capacity of buffer required for reproduction.

The second aspect of the present invention is characterized in that in a data stream unit comprising a plurality of the first units, the playback time of each of the first units is set constant.

Thus, setting the playback times of the first units in the data stream equal facilitates calculation of the start position of the second data required for readout.

The third aspect of the present invention is characterized in that the playback time of the first unit is determined based on one selected from the group consisting of a data transfer rate for input to and output from the recording medium, a seek time, a disk rotation wait time, a bit rate of the first data and a bit rate of the second data.

Thus, the playback time of the first in a data stream can be determined based on the seek time, transfer rate etc., associated with input/output of the recording medium, so that this configuration is free from the problem of breaks occurring in the course of reproduction or recording, due to data writing of the second data.

The fourth aspect of the present invention is characterized in that the first data in the first unit is comprises a set of second units, which are independently reproducible units.

In accordance with the fifth aspect of the present invention, a recording method of recording first data comprising video or audio data and second data to be reproduced in synchronization with the first data, onto a recording medium is characterized in that the first data corresponding to a predetermined playback time and the second data to be reproduced in synchronization with the first data are managed as a first unit, and the first data in the first unit comprises a set of second units, which are independently reproducible units.

This makes it possible to reduce the overhead time during playback from a position partway in the first unit, hence lead to a reduced amount of buffering during recording.

The sixth aspect of the present invention is characterized in that the playback time of each of the second units is set constant in a data stream unit comprising a plurality of the first units.

This makes it possible to facilitate calculation of the starting position of the second unit necessary for readout.

The seventh aspect of the present invention is characterized in that the second unit has dummy data added thereto so that its area size will be equal to an integer multiple of sectors, which are minimum accessible units in the recording medium.

This makes it possible to make the random accessible unit small and simplify the access to the top of the second unit.

The eighth aspect of the present invention is characterized in that each of the second units has identification information showing whether or not the second unit is located at a top of the first unit.

This provides easy adjustment in synchronization upon audio dub recording.

The ninth aspect of the present invention is characterized in that the second data is divided into third units which are independently reproducible units and includes data indicating a starting address of each of the third units.

This enables partial rewriting of the second data upon writing of the second data.

The tenth aspect of the present invention is characterized in that the playback time of the second unit is an integer multiple of a playback time of the third unit.

This makes it possible to control the start and end times of audio dubbing more precisely so that data can be rewritten in more compact units.

The eleventh aspect of the present invention resides in a recording method of recording first data comprising video or audio data and second data to be reproduced in synchronization with the first data, onto a recording medium, characterized in that the first data corresponding to a predetermined playback time and the second data to be reproduced in synchronization with the first data are managed as a first unit and in a data stream unit comprising a plurality of the first units; and in that the playback time of the first unit is determined based on one selected from the group consisting of a data transfer rate for input to and output from the recording medium, a seek time, a disk rotation wait time, a bit rate of the first data and a bit rate of the second data.

This provides the same effect as mentioned in the third aspect.

In accordance with the twelfth aspect of the present invention, a recording medium wherein a first data comprising video or audio data and a second data to be reproduced in synchronization with the first data are divided into blocks of a predetermined amount of data, each block as a unit being subjected to error correction coding and formed into an encoded block, and each of the encoded blocks is recorded as a unit onto the recording medium, is characterized in that the first data corresponding to a predetermined playback time and the second data to be reproduced in synchronization with the first data are managed as a first unit; the second data in the first unit is encoded into an integer number of encoded blocks so as to be arranged continuously, keeping them apart from the first data; and the encoded block of the second data in the first unit is allotted at a boundary between the encoded blocks, appearing first in the first unit.

The thirteenth aspect of the present invention resides in a recording apparatus comprising: an input means for inputting first data comprising video or audio data and second data; a block encoding means for dividing the second data to be reproduced in synchronization with the first data into blocks of a predetermined amount of data, subjecting each block as a unit to error correction coding to be formed into an encoded block; and a recording means for recording the encoded blocks onto a recording medium, characterized in that the block encoding means manages the first data corresponding to a predetermined playback time and the second data to be reproduced in synchronization with the first data, as a first unit, encodes the second data in the first unit into an integer number of the encoded blocks and arranging them continuously, keeping them apart from the first data, and arranges the encoded blocks of the second data in the first unit at a boundary between encoded blocks, appearing first in the first unit.

The twelfth and thirteenth aspects provide the same effect as mentioned in the first aspect.

BRIEF DESCRIPTION OF DRAWINGS

FIG. 7 is a diagram showing the structure of a VU Header Packet in one embodiment of the present invention;

FIG. 10 is a diagram showing the structure of a PRU Header Packet in one embodiment of the present invention;

FIG. 11 is a diagram showing the position of a PRU in one embodiment of the present invention;

FIG. 12 is a diagram showing the structure of an EUS Management file in one embodiment of the present invention;

FIG. 13 is a diagram showing the structure of an EUSI in one embodiment of the present invention;

FIG. 14 is a diagram showing the structure of an Address LUT in one embodiment of the present invention;

FIG. 15 is a diagram showing the structure of a PRU Information in an Address LUT in one embodiment of the present invention;

FIG. 16 is a diagram showing the structure of a VU Information in one embodiment of the present invention;

BEST MODE FOR CARRYING OUT THE INVENTION

Next, the embodiment of the present invention will be described with reference to the drawings.

Figure 1:
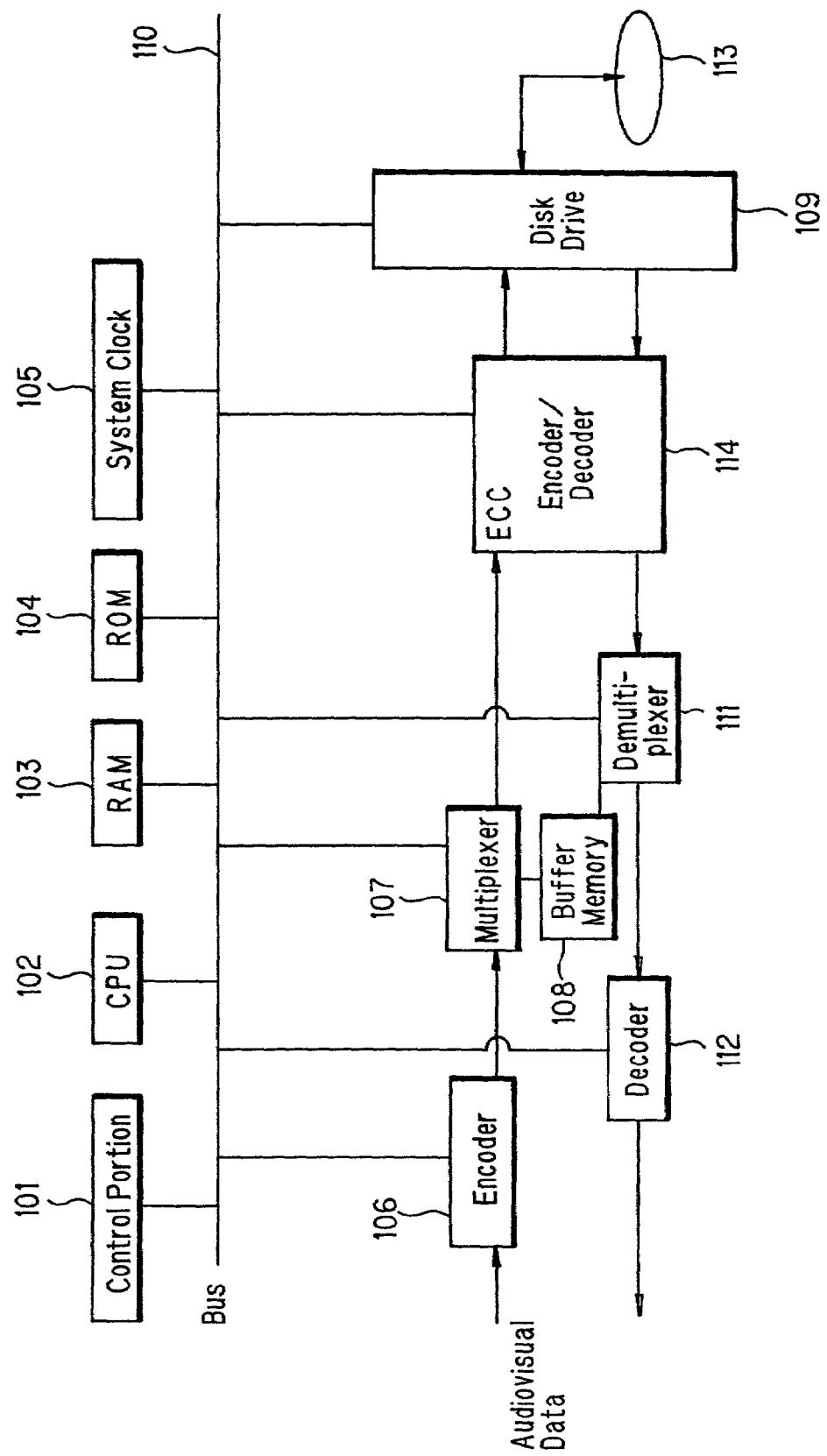
FIG. 1 is a block diagram showing a configuration of one embodiment of the present invention.

FIG. 1 shows a configuration of a video disk recorder according to one embodiment of the present invention, in which audio-dubbing function is made possible. As shown in the drawing, this apparatus is comprised of a control portion 101, CPU 102, RAM 103, ROM 104, system clock 105, buffer memory 108, encoder 106, multiplexer 107, disk drive 109, bus 110, demultiplexer 111, decoder 112, disk 113 and ECC encoder/decoder 114.

Disk 113 is assumed to be a removable optical disk which is recorded and played back spirally from the periphery toward the center. One sector is made up of 2048 bytes of data and sixteen sectors form one ECC block for error correction. If any data in an ECC block needs to be rewritten, it is necessary to read out the whole ECC block containing that data, subject it to error correction, renewing the target data, add error correction codes again to the data to reconstruct an ECC block and record it to the recording medium.

Figure 2:
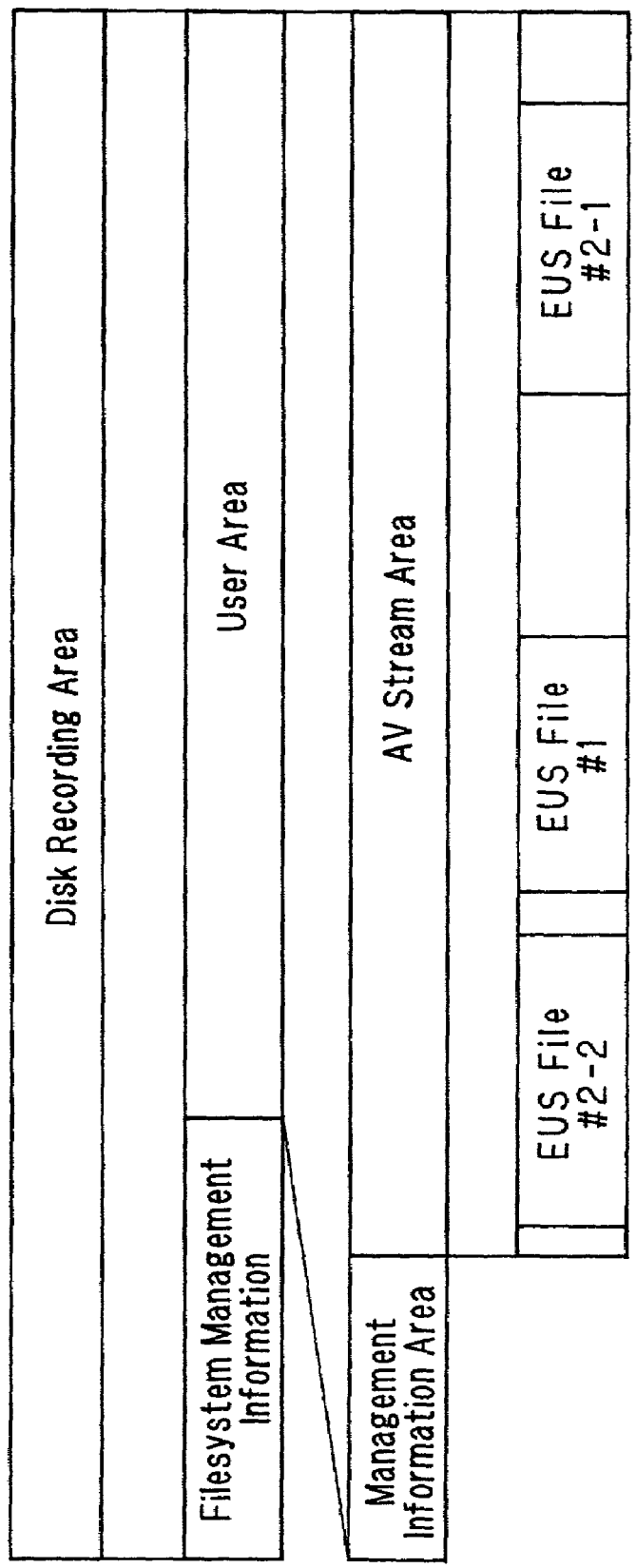
FIG. 2 shows the data arrangement in a disk of one embodiment of the present invention.

FIG. 2 shows a disk 113 configuration. Arranged at the leading end of the disk is filesystem information and the other part is allotted for user area in which individual files are managed by the filesystem. This user area is separated into a management information area and an AV stream area. The management information area contains files relating to management information. The AV stream area contains EUS (editable unit sequence) files. This EUS file is a file of a data stream unit in which a stream of video and audio data from the start of video recording to its end was recorded. The files in the management information area include an EUS Management file which contains information as to the EUS files.

In the present embodiment, an access to each file is made via the filesystem managed by the filesystem management information. Therefore, it is possible to make access to the files, e.g., EUS files #2, which are scattered in the disk by designating continuous logical addresses. Access designated by a logical address is made sector-wise. In this embodiment, the description as to the filesystem is omitted because it does not directly relate to the invention. The term 'address' in the following description should be understood to indicate a logical address unless otherwise specified.

The encoding method used in this embodiment will be described. Original video data is encoded at variable rates around 5 Mbps by the MPEG-2 encoding scheme. For audio, the original data and dubbing data are both sampled at 48 KHz and encoded at a fixed rate of 2-channel 256 kbps by the MPEG-1/Layer II encoding scheme.

Figure 3:
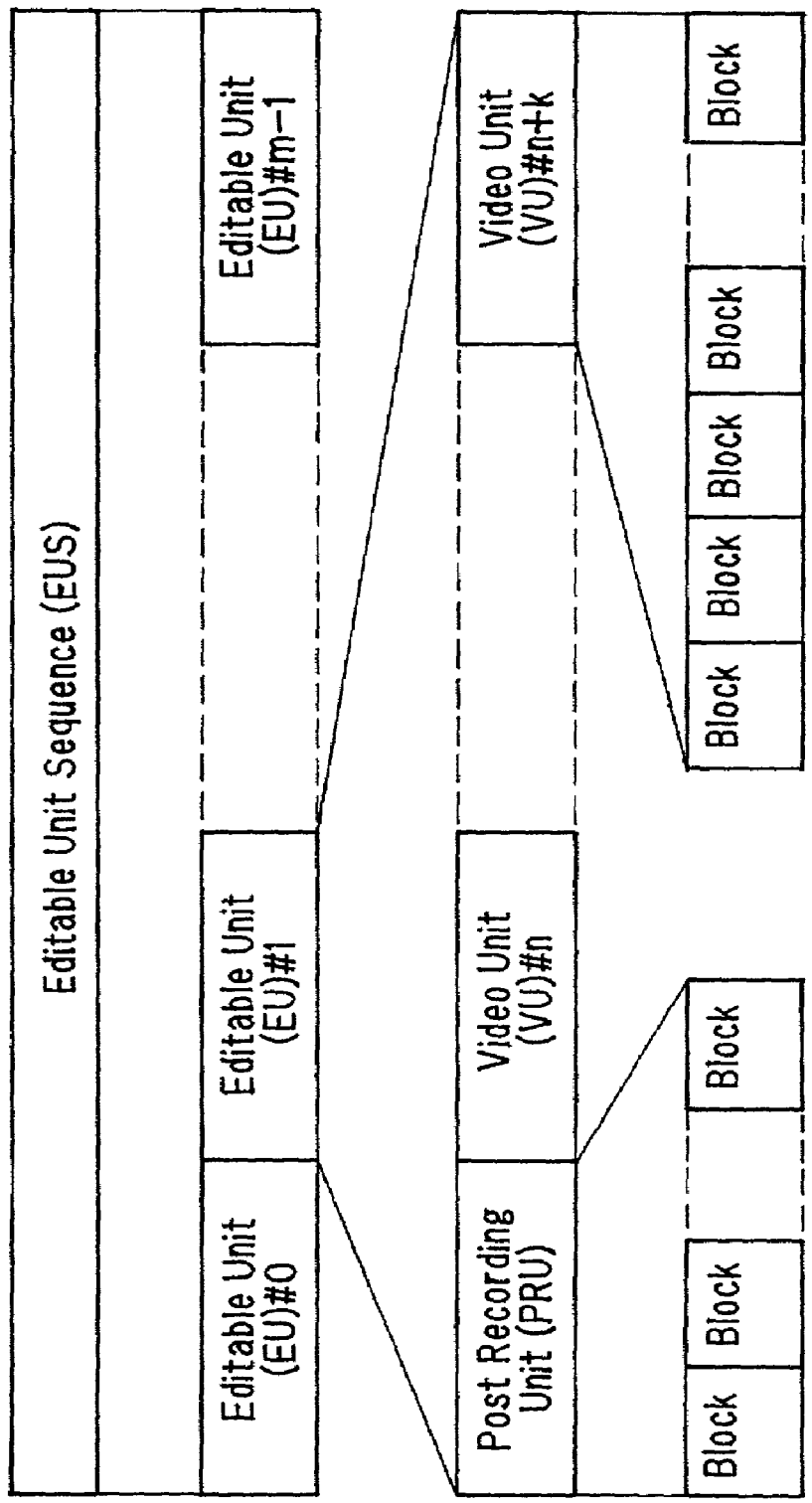
FIG. 3 is a diagram showing an overall configuration of an EUS file of one embodiment of the present invention.

An EUS file is a file that stores an EUS which is the unit of a multiplexed data stream of video and audio information. FIG. 3 shows an overall structure of an EUS. Main elements of an EUS are summarized as follows.

Block: A unit having a fixed length of 2048 bytes of data corresponding to sectors. This is made up of video data defined by ISO/IEC 13818-2, audio data defined by ISO/IEC 13818-3 and other data and packetized into a PES Packet defined by ISO/IEC 13818-1.

VU (Video Unit): A unit for random access during playback. This assures correct decoding of audio and video from partway in an EUS if an access is made from the front end of a VU. This is composed of Blocks.

PRU (Post Recording Unit): An area for recording post recording data (audio dubbing data) associated with a plurality of VUs. This is composed of blocks.

EU (Editable Unit): This is made up of a plurality of VUs with zero or one PRU corresponding to those. One EU is recorded continuously in the disk.

EUS (Editable Unit Sequence): A unit corresponding to a section of Rec Start-to-Stop or Pause. This is made up of an integer number of EUs.

Figure 4:
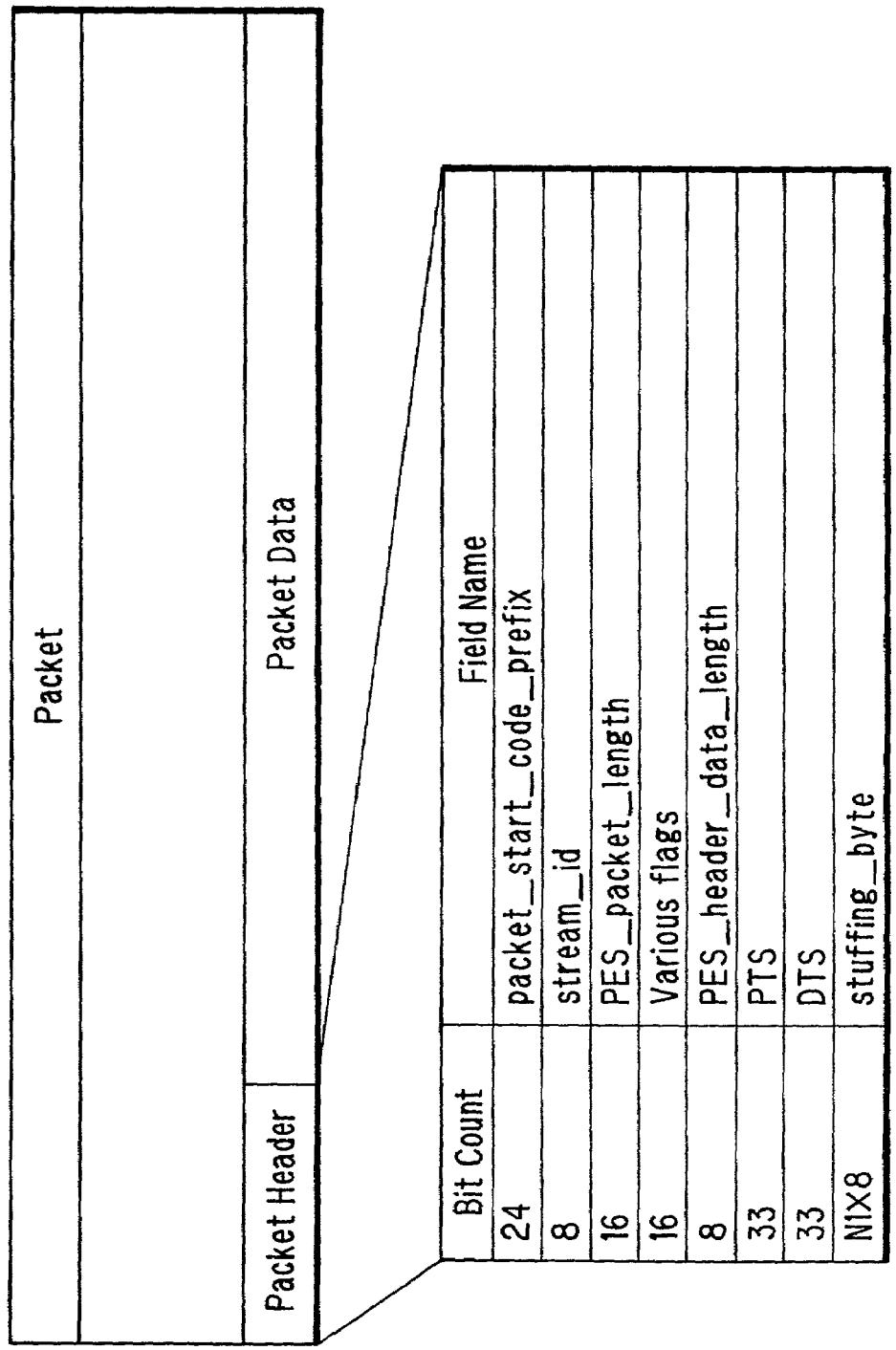
FIG. 4 is a diagram showing the structure of a packet.

In the drawing, each block has fixed length unit of 2048 bytes and one block is stored in one sector. Principally, one block is constituted by one packet. The packet mentioned here should conform to the PES packet defined by ISO/IEC 13818-1. FIG. 4 shows the structure of the packet. The packet is composed of a packet header storing the packet attributes etc. of the packet and a packet data portion storing actual data such as video data etc.

The main information contained in the packet header is as follows. Here, a fieldname representing a piece of information is indicated with a pair of angle brackets < >.

<Packet-start-code-prefix> is the packet start code defined by ISO/IEC 13818-1. <Stream-id> represents the type of the packet. <PES-packet-length> represents the size of data downstream of this field. <PES-header-data-length> represents the size of the packet header. <PTS (presentation time stamp)> is synchronization information between elementary streams such as multiplexed audio and video and other data and represents the timing when an access unit (one frame for video) whose leading end is contained in that packet is played back, with 33 bits of data that indicates the value of a 90 kHz clock count. <DTS (decoding time stamp)> represents the timing when the access unit whose leading end is contained in that packet is decoded, in the same time axis as <PTS>. <Stuffing-bytes> is used to adjust the size of the packet as described as follows.

If the packet does not fill 2048 bytes of data and has a shortage of less than 7 bytes, stuffing bytes are inserted into the packet header. In contrast, if the shortage is 8 bytes or greater, a padding packet equivalent to the shortage is placed at the end of the packet. The stuffing bytes and the padding packet are so-called dummy data which has no effect on actual operations. Types of packets used in this embodiment are summarized as follows:

V-PKT (Video Packet): A packet storing video data defined by ISO/IEC 13818-2

A-PKT (Audio Packet): A packet storing audio data defined by ISO/IEC 13818-3

P-PKT (Padding Packet): A padding packet defined by ISO/IEC 13818-1

VH-PKT (VU Header Packet): A packet storing the header relating to a VU

PH-PKT (PRU Header Packet): A packet storing the header relating to a PRU

The formats for V-PKT, A-PKT and P-PKT conform to those defined by ISO/IEC 13818-1. The formats for other packets will be described later. Blocks constituting an EUS are summarized as follows:

V-BLK (Video Block): A block storing a V-PKT

A-BLK (Audio Block): A block storing an A-PKT

P-BLK (Padding Block): A block storing a P-PKT

VH-BLK (VU Header Block): A block storing a VH-PKT

PH-BLK (PRU Header Block): A block storing a PH-PKT.

Figure 5:
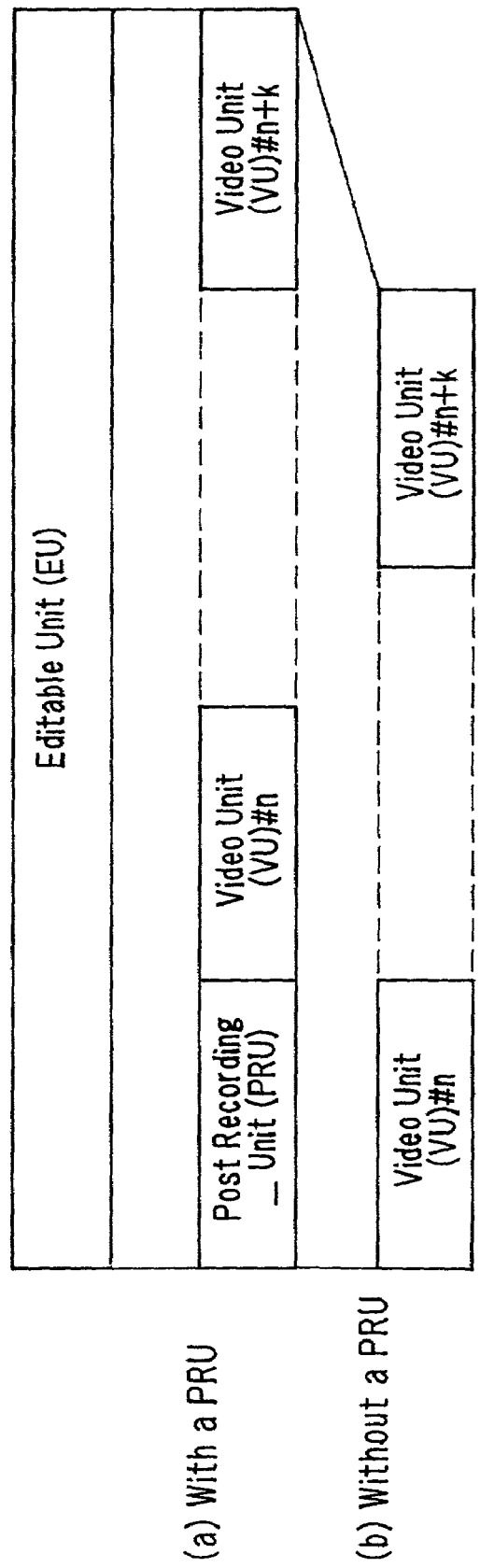
FIG. 5 is a diagram showing the structure of an EU in one embodiment of the present invention.

To begin with, EU will be described. FIG. 5 shows the EU structure. An EU includes an integer number, equal to one or greater, of VUs and zero or one PRU. VUs constituting one EUS all have the same presentation period. That is, the VUs in one EUS always have the same playback time. The last VU in an EUS may be shorter than the other VUs.

Here, the presentation time of a VU containing video data is defined by the number of video fields or video frames contained in the VU multiplied by the video field period or video frame period.

Figure 23:
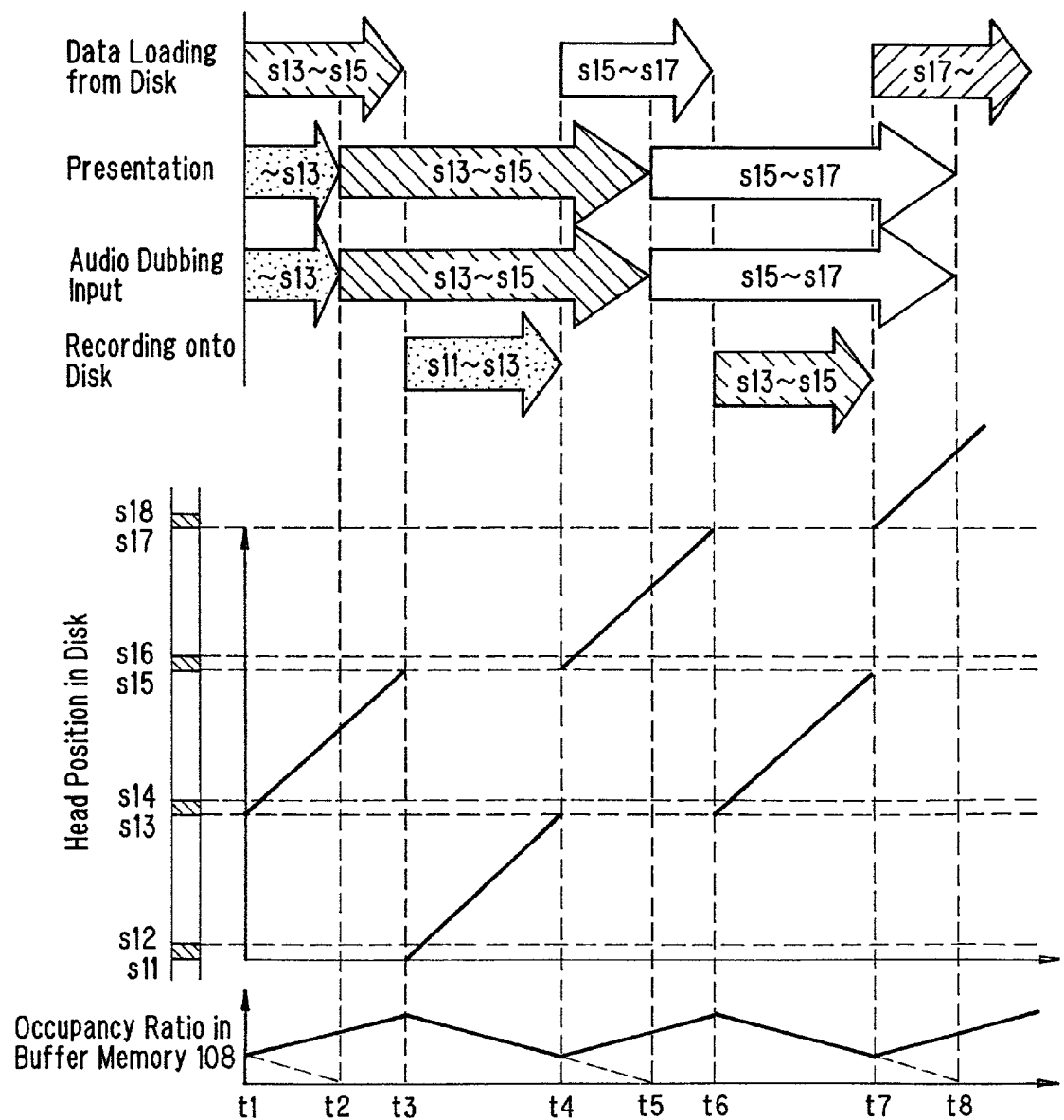
FIG. 23 is a schematic diagram showing head movement and variation in data occupancy ratio in a buffer memory 108 during audio dubbing in accordance with a conventional technology.

EUs constituting one EUS should all have a PRU or should all have no PRU. The number Nvu of VUs constituting one EU should be constant in an EUS, except the last EU in the EUS. That is, in one EUS, the presentation time interval of every EU is constant. For EUSs having no PRU, there is no need to provide a large number of VUs so that Nvu is set equal to 1. For EUSs having PRUs, Nvu should fall within the following range:

$$ceiling\left(\frac{2 \times (Tk + Tv) \cdot Rs}{(Rs - Ro - Ra \cdot Nch)Tpv}\right) \leq Nvu \leq floor\left(\frac{10 \text{ sec.}}{Tpv}\right) \quad \text{[Formula 1]}$$

where Tpv is the presentation time for each VU, Tv is the wait time for disk rotation, Tk is the time required to jump from the track being currently loaded to the track in the dubbing area, Rs is the data transfer rate from the disk, Ro is the bit rate for the entire EUS, Ra is the bit rate per channel of the audio dubbing and Nch is the number of channels of the audio dubbing. In the above formula, ceiling(x) is the function determining the least integer equal to or greater than x and floor(x) represents the function determining the greatest integer equal to or smaller than The reason why the minimum value of Nvu is determined based on the data transfer rate and other factors for EUSs with PRUs is that unless the time for each EU is long enough, the proportion of the over-head time or the time the head is moved from the current loading position to the dubbing area when audio dubbing is carried out sequentially as shown in FIG. 23 would become large, which would make impossible for data loading to keep up with the display, causing breaks in video and audio reproduction.

Next, description will be made of VUs. One VU includes video data made up of a sequence-header followed by an integer number, equal to or greater than one, of GOPs (group of picture) each GOP having an associated GOP header at the front and audio data made up of an integer number of AAUs (audio access units) in synchronization with the video data. GOP is the unit of MPEG video compression and is made up of a plurality of fields or frames. AAU is the compressed data of an audio sample segment, segmented every 0.024 sec. GOP and AAU both need to be decoded from the top of their unit. Since a VU includes an integer number of GOPs and AAUs, each VU can be individually reproducible. The number of video fields per VU should be set at 24 to 60 for NTSC and at 20 to 50 for PAL.

Figure 6:
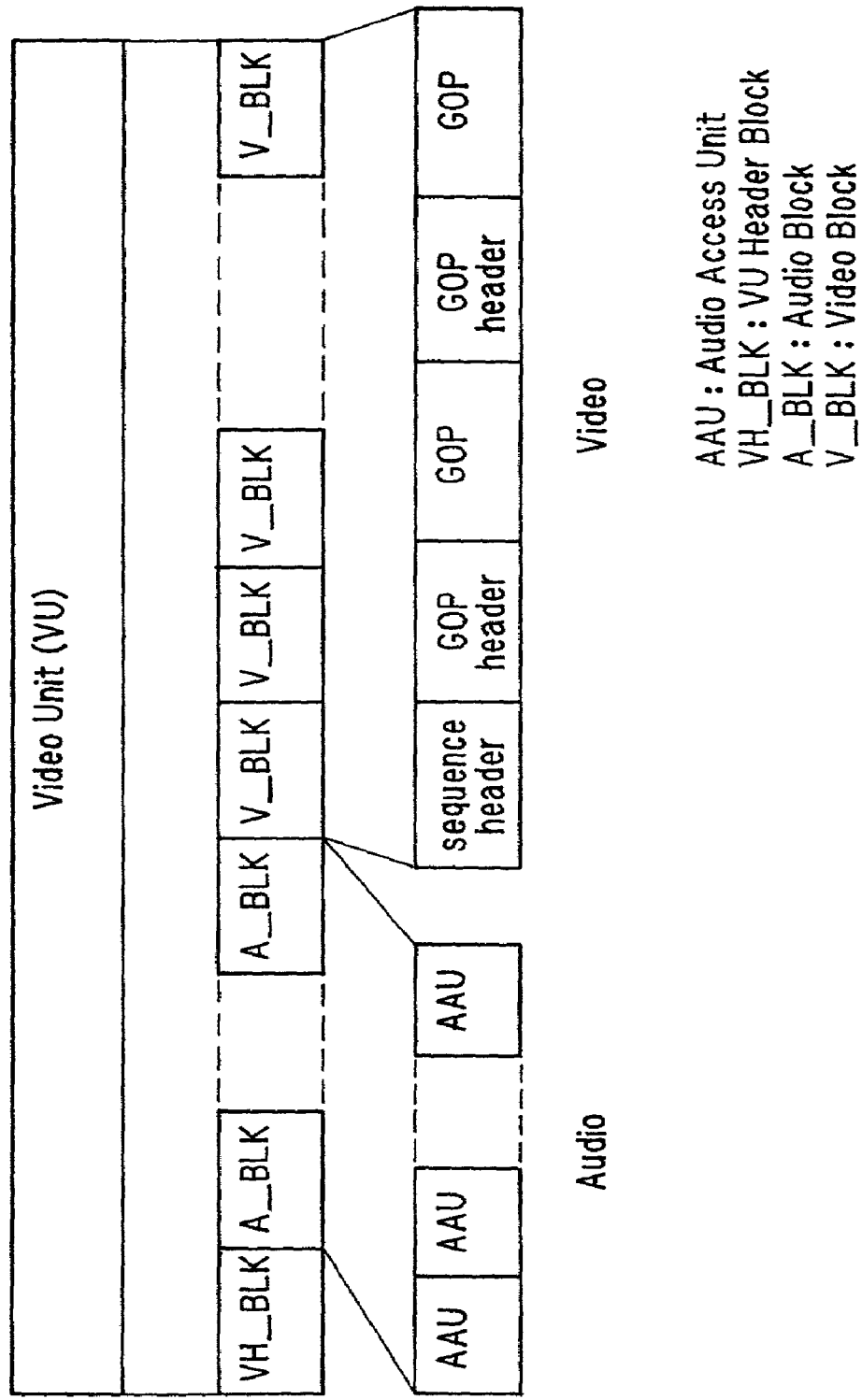
FIG. 6 is a diagram showing the structure of a VU in one embodiment of the present invention.

As shown in FIG. 6, a VU has a VU Header Block (VH-BLK) at the front and a series of A-BLKs storing aforementioned audio data subsequently and a series of V-BLKs storing aforementioned video data at the end. The number of A-BLKs should be large enough to store the aforementioned audio data. When some area remains in the last A-BLK, this can be adjusted using the P-PKT or stuffing bytes as mentioned before. A V-BLK should also be configured similarly.

As described above, one EU is configured of a group of VUs which each are individually reproducible, so that it is possible to make the overhead short when playback starts from a position partway of an EU. If the transfer rate is not high enough compared to the data bit rate, it is necessary to take a large Nvu or make the presentation time per EU long. In this case, if an EU has no units such as of VUs, it is necessary to read the EU from its top even when playback is started from a point close to the end of EU, for example. The result is poor response to the user. Further, when a VU is composed of an integer number of blocks or sectors, access is allowed sector-wise so that access to the top of the VU can be simplified.

FIG. 7 shows the structure of a VH-PKT. In the drawing, BP (byte position) represents the relative position of byte from the top, byte count indicates the number of bytes in each field. <Packet-start-code-prefix>, <stream-id> and <PES-packet-length> are as already stated above. <VU Property> is a bit field of one byte and stores the information as to the VU to which the VU header belongs. Constituting one of the pieces of information, <First VU of EU> is set at 1 if the VU containing the VH-PKT is the top VU in an EU; otherwise it is set 0. This field is used to take synchronism when audio dubbing is implemented. <Length of VU> represents the number of blocks in the VU to which this VU header belongs. <Start RLBN of Video Data> represents the number of blocks from the top of the VU to the start of video data.

Next, description will made of PRU. A PRU is an area storing audio corresponding to an integer number, equal to or greater than one, of VUs. There is zero or one PRU in one EU. One PRU is made up of a minimum integer number of ECC blocks which can contain audio data associated with the presentation time of an EU and a PRU header block. The number of ECC blocks constituting a PRU, denoted by NPRU, ECC is defined as follows:

$$N_{PRU,ECC} = ceiling\left(\left(1 + ceiling\left(\frac{Ra \cdot Nch \cdot Tpv}{2048 - 14}\right) \times Nvu\right) / 16\right)$$ [Formula 2]

Here, the audio data to be recorded in a PRU is recorded at the same data rate and at the same sampling frequency as the audio of VUs in the EU to which the PRU belongs.

Figure 8:
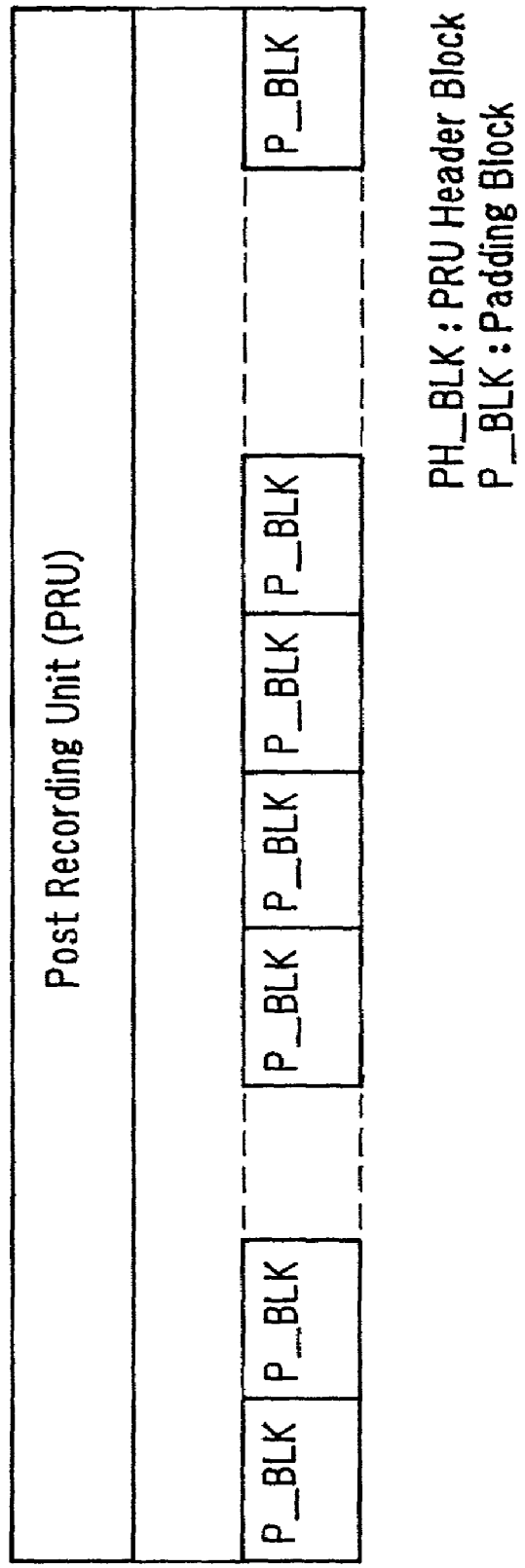
FIG. 8 is a diagram showing the structure of a PRU before audio dubbing in one embodiment of the present invention.

FIG. 8 shows the structure of a PRU immediately after recording of original data. One PRU header block (PH-BLK) is recorded at the front and the remaining area is filled up with Padding blocks (P-BLKs). That is, no audio data is recorded immediately after recording of original data.

Figure 9:
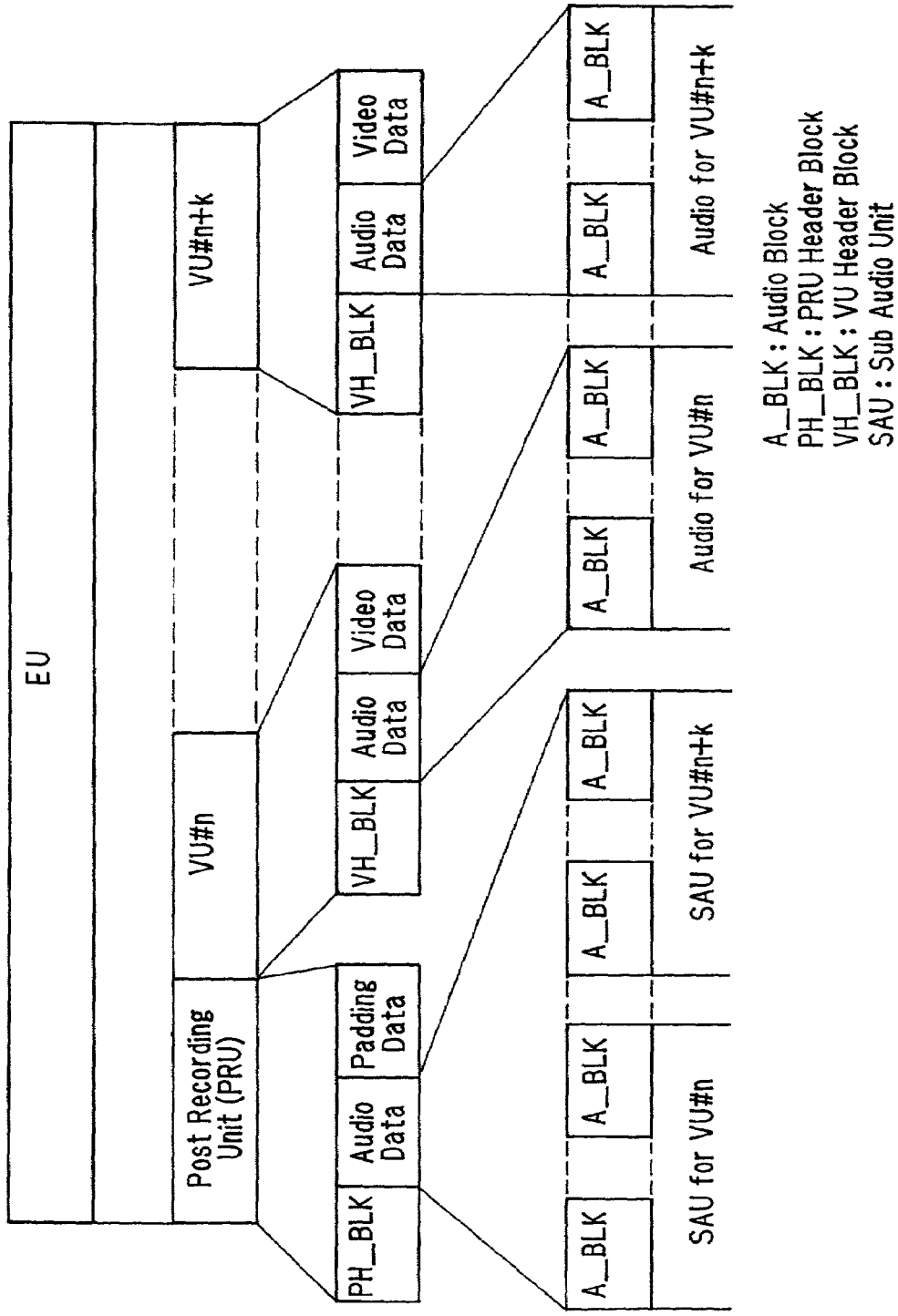
FIG. 9 is a diagram showing the structure of a PRU after audio dubbing in one embodiment of the present invention.

FIG. 9 shows the structure of a PRU after audio dubbing has been performed on the PRU. One PRU header block (PH-BLK) is recorded at the front and a series of A-PLKs of audio data synchronized with the EU are recorded after the PRU header block. The remaining area is filled up with P-BLKs. In this recording, A-BLKs in the PRU are made to be as many in number as the total number of A-BLKs in all the VUs in the same EU. Further, audio data in post-recording is recorded so that A-BLKs in the PRU are arranged in the same order as the A-BLKs in VUs in the same EU and have corresponding PTS values. That is, the PRU after audio dubbing contains all the series of A-BLKs associated with the A-BLKs contained in individual VUs. Such a series of A-BLKs in PRU associated with a VU is called a SAU (sub audio unit). Needless to say, SAU will have an integer number of AAUs as in the VU.

FIG. 10 shows the PH-PKT structure. Definitions of <Packet-start-code-prefix>, <stream-id> and <PES-packet-length> are the same as those in a VU header packet. <Length of PRU> represents the number of blocks constituting the PRU to which this PH-PKT belongs. <Number of VU> represents the number of VUs constituting the EU to which this PH-BLK belongs. <Start RLBN of Data for VU> represents the number of blocks of each SAU from the top of the PRU.

As above, since a PRU is constituted by a group of units (SAUs) containing an integer number of AAUs which is made up of an integer number of blocks or sectors, this configuration facilitates rewriting of audio dubbing data individually in each SAU after the PRU has been loaded into buffer memory 108. The AAUs contained in each SAU are stored in a packet independent of the AAUs in other SAUs, so that rewriting of each SAU will not affect other SAUS. If this arrangement is not adopted, one packet would contain AAUs belonging to different SAUs. In this case, if a PRU having been once dubbed need to be again subjected to an audio dubbing process from a point partway, this needs complicated procedures, specifically depacketizing the packet, locating the top of the AAU, rewriting necessary data and packetizing it again.

Further, since the information representing the top position of each SAU has been inserted in the stream, it is possible to instantly discern the position to start rewriting when PRU is rewritten in each SAU unit-wise.

The arrangement of the data in PRU in the same structure as the audio data in the VUs facilitate data exchange between the PRU and VUs, such as when the audio data in the PRU needs to be partially duplicated in the VUs.

The arrangement of the PRU in an EU will be described. The PRU is placed at an ECC boundary within the first 15 sectors from the top of the EU to which the PRU belongs. In other words, the PRU is placed at the ECC boundary appearing first. For example, when the front of an EU corresponds to an ECC block boundary, the PRU is placed immediately after the front of the EU as shown in FIG. 11(a). When the front of the EU does not correspond to an ECC block boundary, the PRU is placed at the ECC block boundary within the first 15 logical blocks from the EU boundary or at the ECC block boundary appearing first in the EU. In this case, the VU at the front of the EU is decoupled by the PRU.

As above, since a PRU is formed so as to have a size equal to an integer multiple of the ECC block size and the PRU is disposed at the ECC block boundary, it is possible to implement audio dubbing by rewriting only the data of the PRU on the recording medium. This configuration has the advantage that audio dubbing can be done by rewriting the minimum area only.

In the above embodiment, the reason for the PRU being arranged near the front end of the EU is that if a certain EU is reproduced, this arrangement makes it possible to start parallel reproduction of one VU and PRU only after the whole PRU and the VU have been read. If the PRU is arranged near the rear end of an EU, it is impossible to start reproduction of the program until almost all data of the EU has been read out and it is necessary to use a buffer memory for storing almost all the EU.

FIG. 12 shows the structure of an EUS Management file. An EUS Management file is a file that stores information as to management of all EUS files recorded on the disk. The items essential to the present embodiment only will be described hereinbelow.

A field <Number of EUSI> represents the number of EUS files managed by this file. A field <EUSI (EUS Information)> represents the information as to an individual EUS file, hence there are as many fields <EUSI> as <Number of EUSI>. Detailedly, <EUSI> is configured as shown in FIG. 13. In the drawing, <Start PT> and <End PT> represent the starting PTS and end PTS in the EUS file managed by this <EUSI>, of which the most significant bit is omitted. From now on, the format in which the most significant bit of a PTS is omitted will be called PT format. <Post Recording Unit Size> represents the size of the PRU in the EUS file managed by <EUSI>.

Address LUT (lookup table) is a table with which, based on the time code described in PT format, the address at which data corresponding to the time code is recorded is searched. FIG. 14 shows the arrangement of Address LUT.

A field <PB Time of EU> represents the presentation time per EU in 1/90000 [sec.] units on the same scale as the PT format. Similarly, <PB Time of VU> represents the presentation time per VU in 1/90000 [sec.] units. <Number of PRU Information> represents the number of <PRU Information> in the Address LUT and also represents the PRU count in the EUS. Similarly, <Number of VU Information> represents the number of <VU Information> in the Address LUT and the VU count in the EUS.

FIG. 15 shows the content of <PRU Information>. In the chart, <RLBN of PRU> represents the address of the PRU managed by the <PRU Information>. FIG. 16 shows the content of <VU Information>. In the chart, <RLBN of VU> represents the address of the VU managed by the <VU Information>.

Next, the procedure of determining a PRU address corresponding to a certain time code PT using the Address LUT will be described. First, the relative PT is determined by subtracting <Start PT> of <EUSI> from a PT. This relative PT is divided by <PB Time of EU> and dropping digits after the decimal point to determine the index of <PRU Information> for managing the PRU corresponding to the PT. Next, the address given by the <RLBN of PRU> in the <PRU Information> designated by the index represents the address of the PRU corresponding to the target PT. The address of the VU corresponding to the time PT is similarly obtained by subtracting <Start PT> from the PT, dividing it by <PB Time of VU> and dropping digits after the decimal point to determine the index and referring to the <RLBN of VU> in the <VU Information> designated by the index. The reason why the top address of a VU or PRU can be obtained by a simple operation as above is that the presentation time for each EU and VU is set constant.

Next, the processing sequence of performing recording, reproduction and audio dubbing in the above disk format will be described hereinbelow. In the following description, it is assumed that video data is recorded using NTSC, VU is composed of one GOP made up of 30 fields and the maximum bit rate for video is 8 [Mbps]. It is further assumed that the disk transfer rate Rs is 12 [Mbps], the maximum time for the jump to audio dubbing area is 0.3 [sec.] and the maximum wait time for disk rotation Tv is 0.2 [sec.]. The audio bit rate and the number of audio channels are 0.125 [Mbps/channel] and 2 [channel], respectively and commonly used for original recording and audio dubbing. Under these conditions, the presentation time Tpv per VU is set at about 0.5 sec. The range of the VU count Nvu per EU, to which audio dubbing can be performed is $7 \leqq Nvu \leqq 20$. In the present embodiment, Nvu=8, that is, the presentation time per EU is set at about 4 sec.

Figure 17:
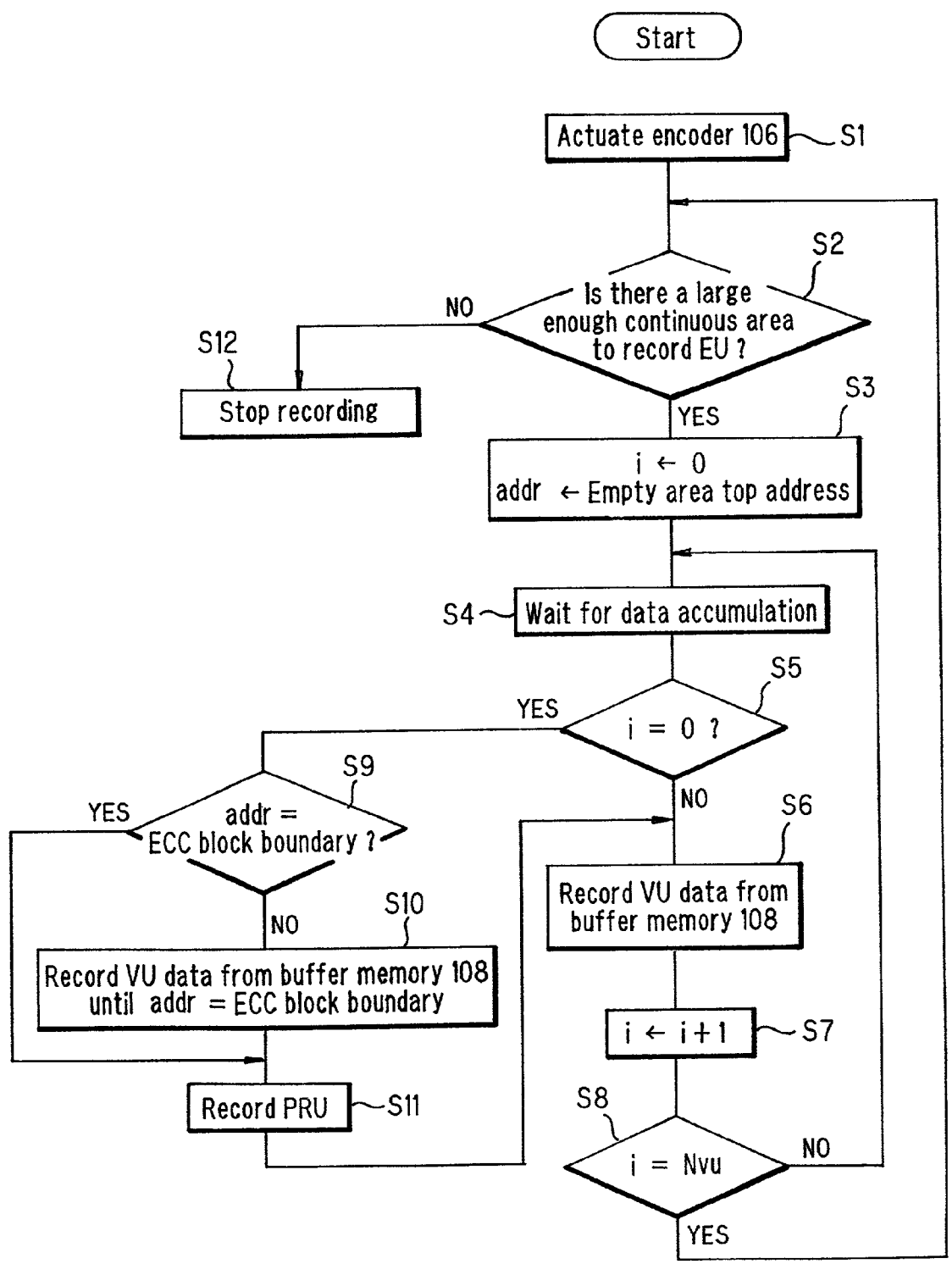
FIG. 17 is a flowchart showing an original data record in one embodiment of the present invention.

The processing sequence of CPU 102 for recording an original program will be described with reference to FIG. 17. It is assumed that the EUS management file and filesystem management information have been loaded in RAM 103 from disk. CPU 102 actuates encoder 106 (Step 1) and then checks based on the filesystem management information whether there is a large enough continuous area to record data of 1 EU on the disk (Step 2). If no, the recording is stopped (Step 12).

If there is a large enough area, a variable i, which represents at which position the VU to be recorded is in the EU, is reset to 0, the top address of the empty area is stored as a variable addr (Step 3). Next, the CPU waits for notification from multiplexer 107 that data of 1 VU has been buffered into buffer memory 108 (Step 4). When receiving the notification from multiplexer 107, the CPU checks whether variable addr corresponds to an ECC block boundary (Step 9) when variable i is 0 (Step 5). If not, the VU data in buffer memory 108 is recorded onto the disk until the next ECC block boundary (Step 10). Then, the CPU creates a PRU in RAM 103 with a PH-PKT and P-PKTs and records it onto the disk (Step 11). Next, the VU data at the top of buffer memory 108 is recorded onto the disk (Step 6). After this recording is completed, variable i is incremented (Step 7). If variable i is smaller than variable Nvu representing the number of VUs in the EU, the operation jumps to step 4 (Step 8). If the variable is not equal to Nvu, the operation goes to Step 2. The above sequence is repeated by EU by EU until a stop command is given from control portion 101 or until insufficiency of continuous area in the disk occurs.

In parallel with the above sequence of CUP 102, multiplexer 107 receives video and audio data from encoder 106, adds PTS etc., to the data and packetizes it so as to be stored into buffer memory 108. When V-PKTs for one GOP and A-PKTs synchronized with it have been stored in buffer memory 108, the multiplexer notifies CPU 102 that data for one VU has been buffered.

Next, description will be made of the processing sequence when a start command of audio dubbing is given by the user whilst the original program recorded in the above procedure is being played back. It is assumed that the EUS Management file and the filesystem management information have been already loaded in RAM 103. CPU 102 actuates decoder 112, and based on the filesystem management information, instructs disk drive 109 to read the designated EUS file from its top. Disk drive 109 transfers the read data to demultiplexer 111 via ECC decoder 112. Demultiplexer 111 accumulates the data into buffer memory 108. Decoder 112 requests demultiplexer 111 to provide the data necessary for playback of video and audio. Demultiplexer 111, in response to the request, sends the accumulated data in buffer memory 108 to decoder 112, appropriately based on <stream-id> in the packet header. When having received a large enough amount of data from demultiplexer 111 to be able to output video and audio, decoder 112 initializes system clock 105 based on the PTS corresponding to that data and thereafter achieves synchronization of the output based on the value of system clock 105.

Demultiplexer 111 always holds in buffer memory 108 two PRUs, specifically, one PRU for the data currently being played back and another PRU for the EU to be reproduced next, in preparation for an instruction of audio dubbing from the user. Further, the demultiplexer creates in RAM 103 a table (PRU management table) for managing these PRUs.

Figure 18:
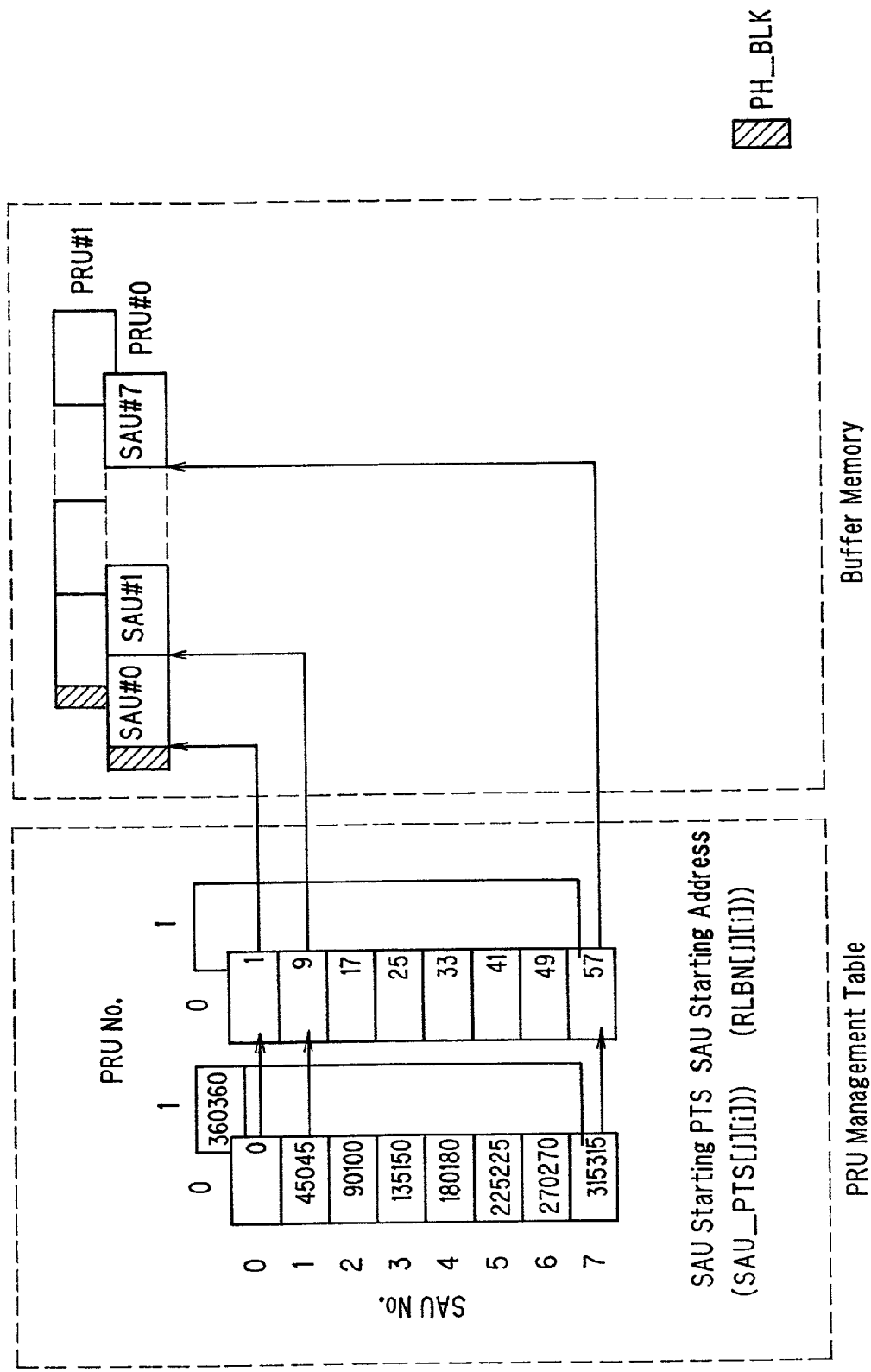
FIG. 18 is a diagram showing the structure of a PRU management table in one embodiment of the present invention.

FIG. 18 shows the structure of a PRU management table. PRU management table is comprised of two tables, namely SAU starting PTS (SAU-PTS[j][i]) and SAU starting address (RLBN[j][i]). SAU-PTS[j][i] is a two-dimensional array, in which the first index designates a PRU number in buffer memory 108 and the second index represents a SAU number in the PRU so that a combination of two indices is able to provide the PTS of the top of a SAU. RLBN[j][i] also has the same structure. That is, two indices represent a PRU number and SAU number in the PRU so as to provide a relative address of the SAU based on the top of the PRU. Use of these two tables makes it possible to know the location of the SAU in buffer memory 108 into which data corresponding to a certain PTS should be recorded.

Next, description will be made of the processing sequence when a command of audio dubbing is given through control portion 101 by the user whilst the above reproducing process is being implemented. First, CPU 102 actuates audio encoder 106. Demultiplexer 111 obtains from system clock 105 the time stamp (audio dubbing starting PTS) at the time when audio dubbing was started and searches for the indices of the maximum PTS not exceeding the audio dubbing starting PTS, from the aforementioned SAU-PTS[j][i]. Demultiplexer 111 sends the PRU number n and SAU number m obtained from the result of the search and the audio dubbing starting PTS to multiplexer 107. Multiplexer 107 stores AAUs sent from encoder 106 into buffer memory 108, from the RLBN[n][m] of the n-th PRU. In accordance with the difference between the top PTS of the SAU from which recording starts and the audio dubbing starting PTS, multiplexer 107, before implementing packetizing, inserts an appropriate number of non sound AAUs before the AAUs sent from audio encoder 106 to adjust timing.

Next, description will made with reference to an example where system clock 105 when audio dubbing is commanded by the user, or in other words, the audio dubbing starting PTS has a value of 228228. First, a search is made among SAU-PTS[i][j] for a combination of the SAU number and PRU number having the maximum SAU starting PTS not exceeding the audio dub starting PTS. In the case shown in FIG. 18, this combination is obtained as PRU number=0 and SAU number=5. Hence, by checking the value of RLBN[0][5] corresponding to this, address 41 of SAU#5 can be obtained. Accordingly, audio dubbing data should start to be recorded from SAU#5, which resides at the forty-first block from the top of PRU#0 in buffer memory 108.

If the PRU to which audio dubbing data is being stored is assumed to be indexed with 'n', when the PRU has been fully stored with data, the values of RLBN[n][i] where i=0 to 7, are stored in the sequential order into the field<Start RLBN of Data for VU> in the PH-PKT of the current PRU and the fact that data has been stored to the end of the PRU is notified to CPU 102. At that time, SAU-PTS [n][0], that is, the top PTS of the EU to which the PRU belongs is also notified. On the other hand, when CPU 102, whilst it is playing back the original program, receives notice from multiplexer 107, the CPU refers to Address LUT based on the top PTS of the EU obtained from that notice, determines the address of the PRU on disk 113 to which the dubbing audio data should be recorded and gives an order to disk drive 109 that the n-th PRU in buffer memory 108 be recorded to the determined address. From then on, the audio dubbing data input to the PRU in buffer memory 108 will be stored in successive turns.

Figure 19:
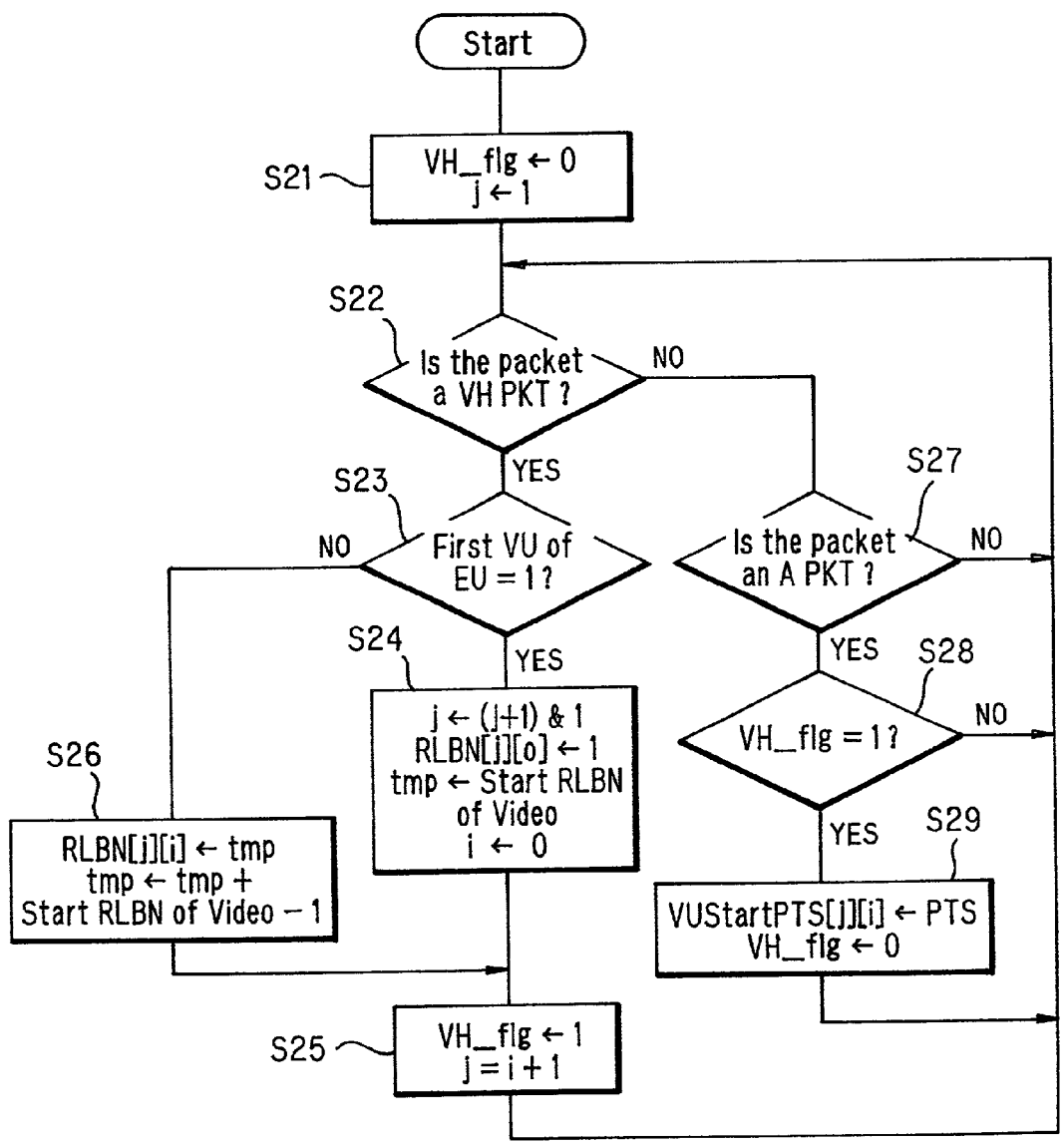
FIG. 19 is a flowchart showing the creation of a PRU management table in one embodiment of the present invention.

FIG. 19 shows the creation procedures of the PRU management table. The basic idea is that the number of A-BLKs contained in each VU is determined from <Start RLBN of Video> in the VH-PKT, and using the fact that the number is equal to the number of A-BLKs contained in the associated SAU, the SAU starting address table is created, at the same time the PTS of the first A-PKT in the VU is extracted so as to create the SAU starting PTS table.

First, VH-flg, the flag that indicates the fact that the position is immediately after a VH-PKT, is reset and j, the index indicating the PRU number in buffer memory 108 is set at 1 (Step 21). When a packet which arrived at demultiplexer 111 is a VH-PKT (step 22), the operation goes to Step 23. Otherwise, the operation goes to Step 27.

When the packet is a VH-PKT, it is checked whether the field <First VU of EU> in the VH-PKT is 1 (Step 23). If 1, j is incremented in order to change the data storage area from the current PRU to the other PRU. At the same time, RLBN[j][0] is set at 1. Further, the value of field <Start RLBN of Video> in the current VH-PKT is stored as a temporary variable tmp and i is set at 0 (Step 24). If field <FirstVU of EU> is 0, temporary variable tmp is set into RLBN[j][i], and the value of field <Start RLBN of Video> in the current VH-PKT minus 1 is added to tmp (Step 26). Here, subtraction of 1 means that one as the VH-BLK should be subtracted from the value of <Start RLBN of Video> which is the number of A-BLKs in the VU plus the number of the VH-BLK or 1, in order to determine the number of A-BLKs in the VU, which are needed at this point. Then, whichever is the value of field <FirstVU of EU>, VH-flg is set at 1 and i is incremented (Step 25).

At Step 27, it is checked whether the packet which arrived at demultiplexer 111 is an A-PKT. If it is an A-PKT, the operation goes to Step 28, or otherwise it goes to Step 22. At Step 28, variable VH-flg is checked. If VH-flg is 1, the PTS in the packet header of the packet is set into SAU-PTS[j] [i] and VH-flg is reset at 0 (Step 29).

The above process is effected for every block so that it is possible to prepare a PRU management table for the PRU in one EU when all the data of the EU has been read.

The head position in the disk during audio dubbing and time-dependent variation in the amount of original data occupied in buffer memory 108 will be described with reference to FIG. 20. Here, it is assumed that the program is allotted in a continuous area s11-s18 in the disk, where areas s11-s13, s13-s15 and s15-s17 correspond to respective EUs and areas s11-s12, s13-s14, s15-s16 and s17-s18 correspond to respective PRUs.

It is assumed at time t1 that the area up to s13 has been all loaded in buffer memory 108, whilst video presentation of area s11 to s13 is being displayed and viewed, audio dubbing input for it is performed. The input audio dubbing data is assumed to be stored into one PRU (PRU#0) in buffer memory 108.

During the period of time t1 to t3, disk drive 109 reads data from the area s13-s15. Time t2 corresponds to the time at which the VU read from area s12-s13 up to time t1 has been used up for video reproduction.

Time t3 corresponds to the time at which encoding of the audio dubbing data input while the presentation of VU from area s12-s13 was being viewed ends. At this point of time, data is recorded to the end of PRU#0, and multiplexer 107 notifies the starting PTS of the PRU to CPU 102 and switches the destination of storage of the audio dubbing data to the other PRU (PRU#1).

In this embodiment, data reading from the disk and encoding of audio dubbing are adapted to end simultaneously at time t3, but needless to say it is not essential that they end at the same time.

CPU 102 determines from the starting PTS sent from multiplexer 107 the address at which the content of PRU#0 should be recorded, or the address of area s11-s12 and records the content of PRU#0 onto disk 113 during the period from t3 to t4.

At time t5, data from the next area s15 to s17 starts to be read. This data reading can be started at any timing after the completion of writing at t4 (between t4 and t6), as long as buffer memory 108 does not cause overflow and all the data in buffer memory 108 does not run out (underflow does not occur). The same cycles of the above process are repeated thereafter and downward.

Figure 20:
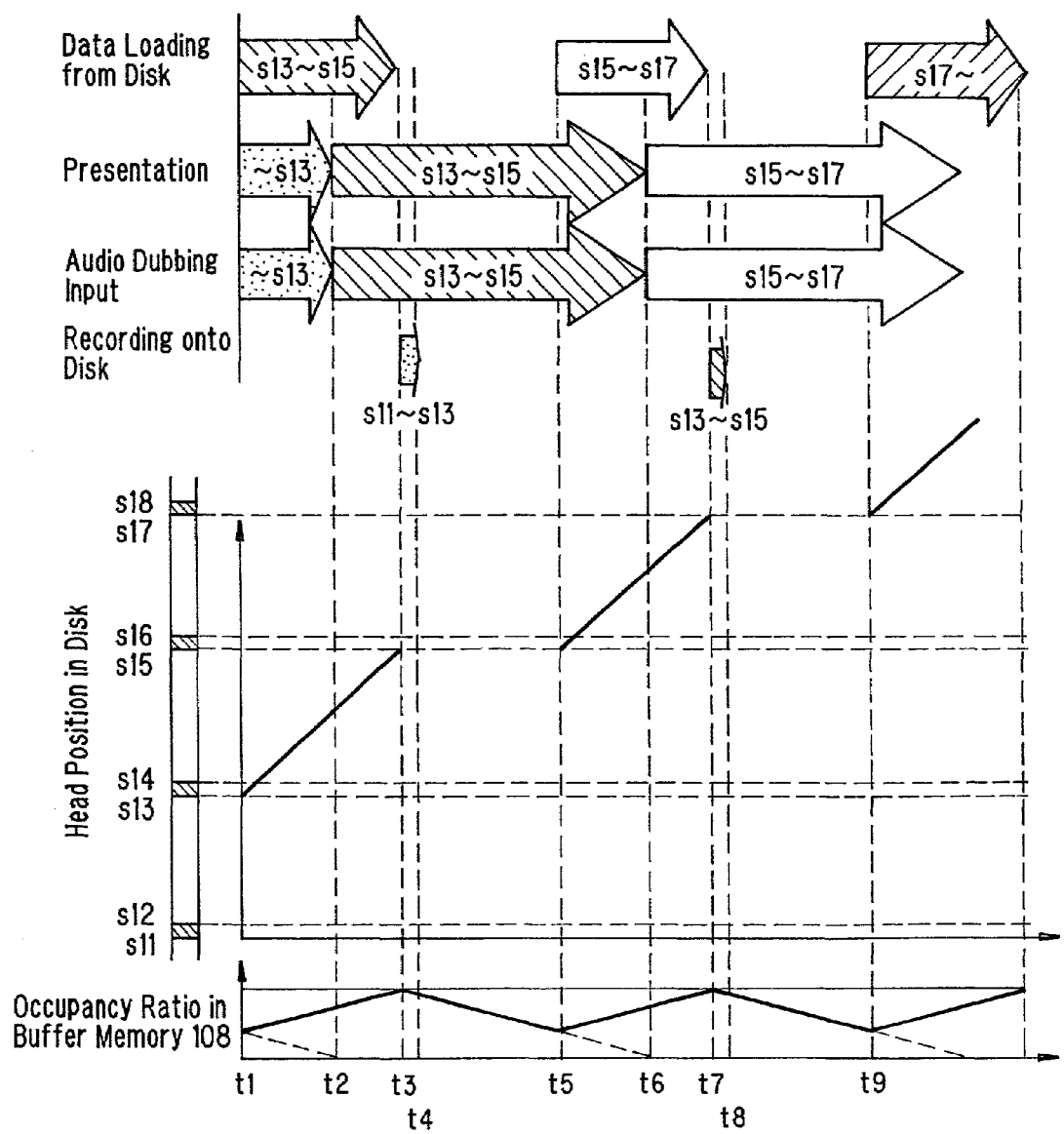
FIG. 20 is a schematic diagram showing head movement and variation in data occupancy ratio in a buffer memory 108 during audio dubbing.

According to the present embodiment, since the time for writing audio dubbing data can be made shorter compared to the conventional configuration, it is possible to shorten the period of time t4 to t5 in FIG. 20. This feature contributes to playing back video and audio without breaks even if the presentation time is short compared to the data reading time from the disk (e.g., when a large amount of information is allotted per time unit or when reading and transfer rate of the disk is low).

In the present embodiment, field <Start RLBN of Data for VU> in PH-PKT is recorded during audio dubbing. However, this is a fixed value, hence this may be recorded beforehand when the original data is recorded. Further, an extra field for recording the starting PTS of each SAU may be added to PH-PKT. In this case, if the values were recorded beforehand into that field when original data was recorded, it is possible to obtain necessary information for constructing a PRU management table by reading the PH-PKT when audio dubbing is implemented, hence this eliminates the necessity of the procedures shown in FIG. 19.

In the present embodiment, field <First VU of EU> in VH-PKT is used to represent the top of EU. However, a packet that represents the boundary between EUs may be inserted at the top of each EU.

In the present embodiment, the presentation time of SAU and that of VU are set equal, but this is not essential. In particular, it is possible to control the start and end time of audio dubbing with a higher precision by setting the presentation time of SAU shorter than VU, for example, by halving or quartering it. In the present embodiment, when audio dubbing is started from a position partway in an EUS on which audio dubbing data has been once recorded, in the worst case, the recorded audio dubbing data might be overwritten by null data of a length of about one SAU (equal to one VU) before and after the audio dubbing section. However, if SAU is formed shorter as to time than VU, it is possible to reduce the range that is overwritten by null data.

Next, description will be made of the procedure when the program thus overwritten with audio dubbing data is played back from partway within it. It is assumed that the filesystem management information and EUS Management file have been already loaded from the disk into RAM 103. CPU 102, based on the program and timing designated by the user, determines the EUS file and PTS (playback start PTS) corresponding thereto and sends the information to demultiplexer 111 and decoder 112. Then, using Address LUT, the CUP, based on the playback start PTS, calculates the starting address (VU start address) of the VU to which the associated data belongs and the starting address of the PRU (PRU start address).

Figure 21:
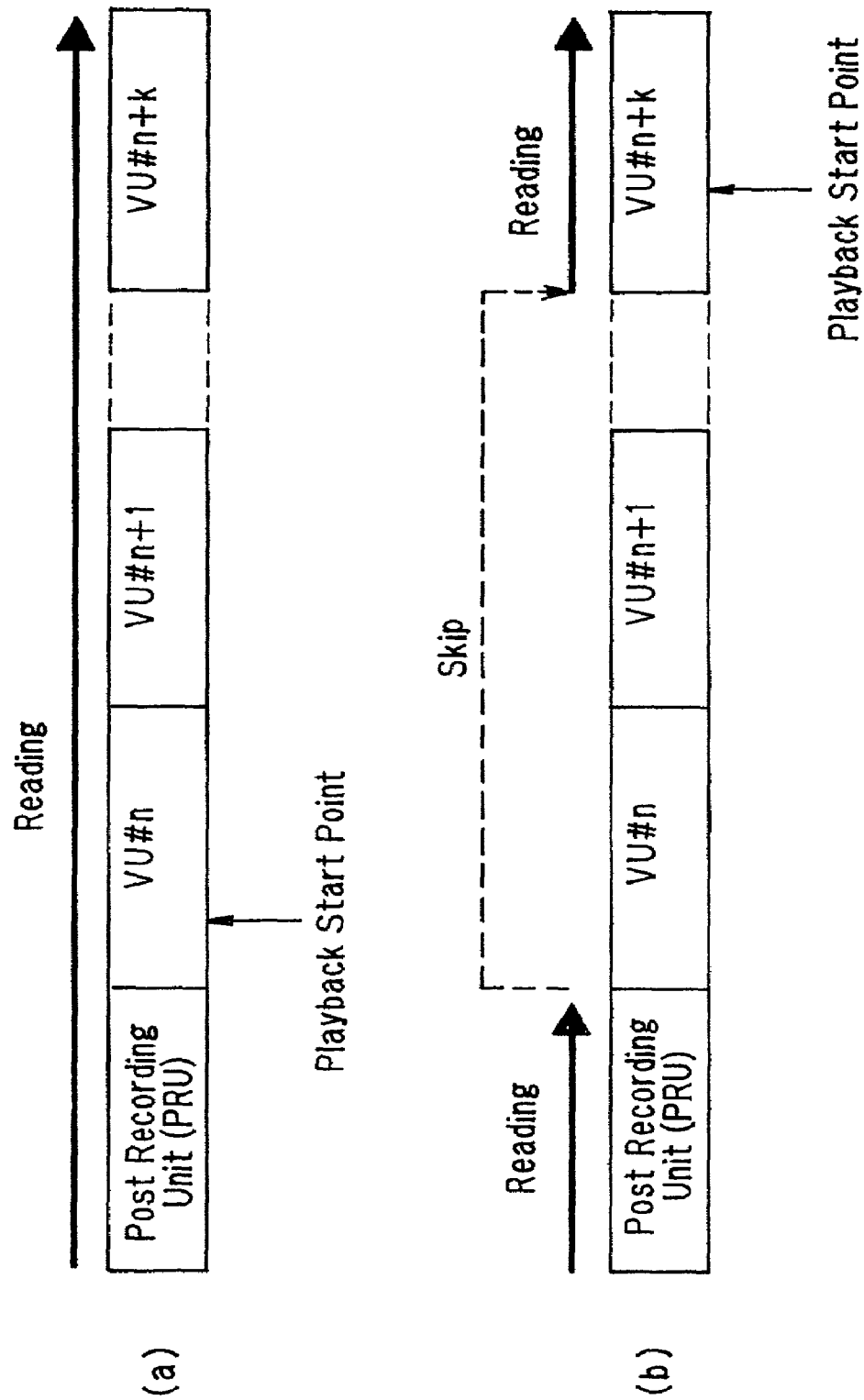
FIG. 21 is a diagram showing an accessing process when playback is started from a position partway in an EU in one embodiment of the present invention.
Figure 22:
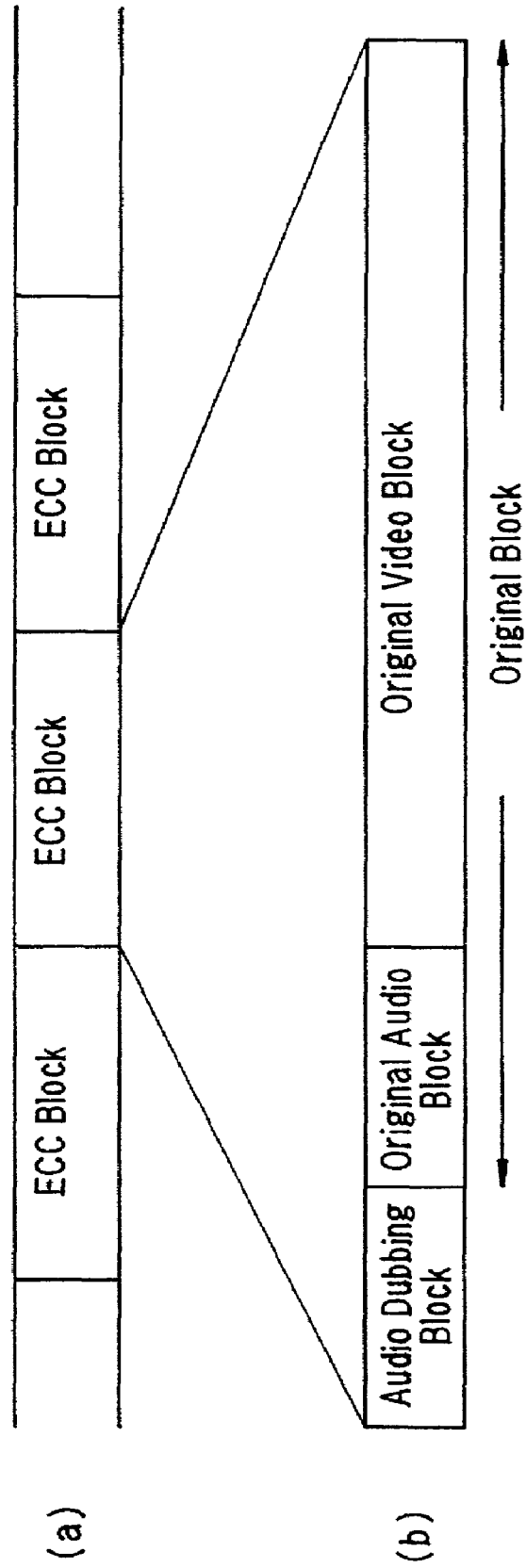
FIG. 22 is a diagram showing the recording format on a disk in accordance with a conventional technology.

At this point, when the address difference between the PRU and VU is small as shown in FIG. 21(a), the CPU gives an instruction to disk drive 109 to start reading data from the lower address of those of VU and PRU. On the other hand when the address of the VU is larger by a certain degree than that of the PRU as shown in FIG. 21(b), or when playback is started from a VU which belongs to the rear half of the EU, CPU 102 first gives an instruction to disk drive 109 to read data from the PRU start address by the amount of data designated by the PRU data size, which is given by <Post Recording Unit Size> in EUSI, and then gives an instruction to read data from the VU start address. This is because when playback is started from a VU in the rear half of the EU, skipping the VUs located prior eliminates wasted reading of data and makes response to the user fast.

Demultiplexer 111 accumulates the data sent from disk drive 109 by way of ECC decoder 112 into buffer memory 108 and sends the data, in order, in response to decoder 112 if a data request is made from decoder 112. Decoder 112 requests data to demultiplexer 111 and decodes the received data. When the playback start PTS resides at a partway point in a GOP, video decoder 112 decodes the GOP from its start point and produces the video output from the timing of the playback start PTS. Audio decoder 112 similarly decodes the data received from demultiplexer 111 and produces the sound output from the timing of the playback start PTS. Since video decoding needs longer time, audio decoder 112 waits for video decoder 112 to become able to present the video output at the playback start PTS and sets system clock 105 at the playback start PTS to start the presentation.

The main features and effects of the present embodiments will be described hereinbelow.

The present embodiment is a recording method of recording data onto a recording medium whereby the first data comprising video or audio data and the second data to be reproduced in synchronization with the first data are divided into blocks of a predetermined amount of data, and each block as a unit is subjected to error correction coding and formed into an encoded block to be recorded onto the recording medium, and is characterized in that the first data corresponding to a predetermined playback time and the second data to be reproduced in synchronization with the first data are managed as the first unit, the recording area into which the second data is recorded is formed of a continuous area in the first unit, and the encoded block including the top of the second data is encoded separately from the first data.

Illustratively, in the recording method, original data (the first data) comprising video or audio data and audio dubbing data (the second data) to be reproduced in synchronization with the original data are divided into blocks of a predetermined amount of data, and each block as a unit is subjected to error correction coding and formed into an encoded block (ECC block) so that the data is recorded by ECC block units onto the recording medium. The original data corresponding to a predetermined playback time and the audio dubbing data to be reproduced in synchronization with the original data are managed as a unit (the first unit) called EU (Edible Unit), the recording area called PRU (Post Recording Unit) into which the audio dubbing data is recorded is formed of a continuous area in the EU, and the encoded block including the top of the PRU is encoded separately from the original data.

In this way, the ECC block including a PRU is constructed of the PRU only, so that there is no need to wastefully make access to the original data to read and rewrite the data, which would have been necessary when performing audio dubbing in the conventional method and hence audio dubbing can be performed by rewriting the minimum area.

Further, the present embodiment is characterized in that the encoded block containing the top of the second data is arranged at the boundary between encoded blocks, appearing first in the first unit. Specifically, the encoded block containing the top of the PRU is arranged at the position at which the first boundary between encoded blocks appears in the EU.

In this way, the PRU is located at the ECC block boundary appearing first, therefore it is possible to implement synchronized playback when the whole PRU and one VU have been loaded and reduce the capacity of buffer required for reproduction.

Also, the present embodiment is characterized in that in a data stream unit comprised of a plurality of the first units, the playback time of each of the first units is set equal. That is, in a data stream unit called EUS (Editable Unit Sequence) made up of a plurality of EUs, the playback times of all the EUs are set equal.

In this way, setting the playback times of the EUs, in an EUS, equal makes it possible to facilitate calculation of the start position of the PRU required for readout.

The present embodiment is characterized in that the playback time of the first unit is determined based on one selected from the group consisting of the data transfer time for input to and output from the recording medium, seek time, disk rotation wait time, the bit rate of the first data and the bit rate of the second data. Illustratively, the playback time of the EU is determined based on one selecting from the group consisting of the data transfer time for input to and output from the recording medium, seek time, disk rotation wait time, the bit rate of the first data and the bit rate of the second data.

In this way, the playback time of the EU in an EUS can be determined based on the seek time, transfer rate etc., associated with input/output of the recording medium, so that this configuration is free from the problem of breaks occurring in the course of reproduction or recording of audio dubbing data, due to frequent occurrence of seek in the audio dubbing mode.

The present embodiment is also characterized in that the first data in the first unit comprises a set of second units, which are independently reproducible units and the playback time period of each of the second units is set equal in the data stream unit comprising a plurality of the first units. Illustratively, the original data (the first data) in the EU (the first unit) comprises a set of second units, which are independently reproducible units called Vus (Video Units) and the playback time periods of UVs are set equal in the EUS comprising a plurality of the EUs.

Thus, provision of VUs makes it possible to reduce the overhead time during playback from a position partway in EU, hence lead to a reduced amount of buffering during recording. Further, since the playback periods of time of VUs are made equal, the playback time of one EU and that of one VU in an EUS can be fixed, thus making it possible to facilitate calculation of the starting position of a VU necessary for readout.

The present embodiment is characterized in that the second unit has dummy data added thereto so that its area size will be equal to an integer multiple of sectors, which are the minimum accessible units in the recording medium. Illustratively, the VU has dummy data added thereto so that the VU area size will be equal to an integer multiple of sectors, which are the minimum accessible units in the recording medium.

Thus, creating the second unit area with an integer multiple of sectors makes it possible to make the random accessible unit small, simplifying access to the top of an The present embodiment is further characterized in that each of the second units has identification information showing whether or not the second unit is the second unit located at the front in the first unit. Specifically, each VU has identification information showing whether or not the VU is the one which is located at the top in the EU. This provides easy adjustment of synchronization upon audio dubbing.

The present embodiment is further characterized in that the second data is divided into the third units which are independently reproducible units and includes the data indicating the starting address of each of the third units. That is, the PRU (the second data) is divided into SAUs (Sub Audio Units) as the third units which are independently reproducible units and includes the data indicating the starting address of each SAU. This enables partial rewriting of audio dubbing data upon audio dubbing. VUs are units which are independently reproducible. The RPU are divided into a plurality of SAUs in association with the VUs, and each VU is related to the starting address of the associated SAU. Further, since the size of a SAU as well as VU is an integer multiple of the size of sector, audio dubbing data can be partially rewritten upon audio dubbing.

The present embodiment is further characterized in that the playback time of the second unit is an integer multiple of the playback time of the third unit. Illustratively, the playback time of a VU is an integer multiple of the playback time of a SAU. This makes it possible to control the start and end times of audio dubbing more precisely so that data can be rewritten in more compact units.

The present embodiment is a recording medium wherein the first data comprising video or audio data and the second data to be reproduced in synchronization with the first data are divided into blocks of a predetermined amount of data, each block as a unit is subjected to error correction coding and formed into an encoded block, and the error correction blocks are recorded onto the recording medium, and is characterized in that the first data corresponding to a predetermined playback time and the second data to be reproduced in synchronization with the first data are managed as the first unit; the recording area for recording the second data is arranged continuously in the first unit, and the encoded block including the top of the second data is kept separated from the first data and encoded.

The present embodiment is a recording apparatus comprising: an input means for inputting the first data comprising video or audio data and the second data; a block encoding means for dividing the second data to be reproduced in synchronization with the first data into blocks of a predetermined amount of data, subjecting each block as a unit to error correction coding to be formed into an encoded block; and a recording portion for recording the encoded blocks onto a recording medium, and is characterized in that the block encoding means manages the first data corresponding to a predetermined playback time and the second data to be reproduced in synchronization with the first data, as the first unit, the recording area for recording the second data is arranged continuously in the first unit, and the encoded block including the top of the second data is kept separated from the first data and encoded.

INDUSTRIAL APPLICABILITY

As has been described heretofore, the present invention is suitable for implementing recording and reproduction of video data and audio data onto a recording medium which is randomly accessible such as a hard disk, optical disk, etc., and in particular, in order to eliminate the necessary of reading and rewriting of unnecessary original data when rewriting audio dubbing data.

The invention claimed is:

1. A recording method of recording data onto a recording medium whereby first data comprising video or audio data and second data to be reproduced in synchronization with the first data are divided into blocks of a predetermined amount of data, each block as a unit is subjected to error correction coding and formed into an encoded block, and each of the encoded blocks is recorded as a unit onto the recording medium, the recording method comprising the steps of:

managing the first data corresponding to a predetermined playback time and the second data to be reproduced in synchronization with the first data as a first continuous unit;

encoding the second data in the first continuous unit into an integer number of encoded blocks and arranging said integer number of encoded blocks of second data in said first continuous unit in a continuous sequence separated from said first data; and arranging the continuous sequence of encoded blocks of second data in the first continuous unit immediately following a boundary of an encoded block of said first data that appears at a leading end of the first continuous unit or first in the first continuous unit according to the synchronism requirements of said encoded blocks of said first data and said second data.

2. The recording method according to claim 1, wherein in a data stream unit comprising a plurality of the first units, the predetermined playback time of each of the first units is set constant.

3. The recording method according to claim 1 or 2, wherein the predetermined playback time of the first continuous unit is determined based on one selected from the group consisting of a data transfer rate for input to and output from the recording medium, a seek time, a disk rotation wait time, a bit rate of the first data and a bit rate of the second data.

4. A recording method according to claim 1, wherein the first continuous unit comprises a set of second units, which are independently reproducible units.

5. The recording method according to claim 4, wherein a playback time of each of the second units is set constant in a data stream unit comprising a plurality of the first continuous units.

6. The recording method according to claim 4 or 5, characterized in that each second unit has dummy data added thereto to the extent required to make its area size equal to an integer multiple of sectors, wherein a sector is a minimum accessible unit recorded on the recording medium.

7. The recording method according to claim 4, wherein each of the second units has identification information showing whether or not that second unit is located first in the first unit.

8. The recording method according to claim 4, wherein the second data is divided into third units which are each independently reproducible and each third unit includes data indicating a starting address thereof.

9. The recording method according to claim 8, wherein the playback time of a second unit is an integer multiple of a playback time of the third units into which it is divided.

10. A recording method according to claim 1, wherein a plurality of the first continuous units form a data stream unit; and a playback time of the data stream unit is determined based upon the predetermined playback time of the first continuous units of which it is formed, the predetermined playback times of the first units being determined based on one selected from the group consisting of a data transfer rate for input to and output from the recording medium, a seek time, a disk rotation wait time, a bit rate of the first data and a bit rate of the second data.

11. A computer for receiving, recording and playing back data in response to associated start commands characterized in that:

first data comprising video or audio data and second data to be reproduced in synchronization with the first data are divided into blocks of a predetermined amount of data, each block as a unit is subjected to error correction coding and formed into an encoded block, and each of the encoded blocks is recorded as a unit onto the recording medium, the first data corresponding to a predetermined playback time and the second data to be reproduced in synchronization with the first data are managed as a first continuous unit;

the second data in the first continuous unit is encoded into an integer number of encoded blocks and said integer number of encoded blocks of second data in said first continuous unit are arranged in a continuous sequence separated from said first data; and said continuous sequence of encoded blocks of second data in the first continuous unit is arranged immediately following a boundary of an encoded block of said first data that appears at a leading end of the first continuous unit or first in the first continuous unit according to the synchronization requirements of said encoded blocks of said first data and said second data.

12. A recording apparatus comprising:

an input means for inputting first data comprising video or audio data and second data to be reproduced in synchronization with the first data;

a block encoding means for dividing the first data and the second data into blocks of a predetermined amount of data, and subjecting each block as a unit to error correction coding so as to form an encoded block; and a recording means for recording the encoded blocks of first data and the encoded blocks of second data as first continuous units in a data stream onto a recording medium, characterized in that the block encoding means manages the first data of each first continuous unit corresponding to a predetermined playback time and the second data of each first continuous unit to be reproduced in synchronization with the first data, encodes the second data in each first continuous unit into an integer number of the encoded blocks and arranges the encoded blocks of the second data of each first continuous unit continuously, keeping them apart from the first data, and further arranges the encoded blocks of the second data in each first continuous unit at a leading end of the first continuous unit or at a trailing boundary of an encoded block of the first data that appears first in that first continuous unit.

* * * * *